(12) United States Patent
Matsugashita

(10) Patent No.: US 8,804,162 B2
(45) Date of Patent: Aug. 12, 2014

(54) INFORMATION PROCESSING APPARATUS, PRINTING SYSTEM, MONITORING METHOD, PROGRAM, AND STORAGE MEDIUM

(75) Inventor: Hayato Matsugashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 984 days.

(21) Appl. No.: 11/749,022

(22) Filed: May 15, 2007

(65) Prior Publication Data

US 2007/0273922 A1 Nov. 29, 2007

(30) Foreign Application Priority Data

May 29, 2006 (JP) ................................ 2006-148242

(51) Int. Cl.
*G06F 3/12* (2006.01)
(52) U.S. Cl.
USPC .......................................... 358/1.15; 358/1.1
(58) Field of Classification Search
None
See application file for complete search history.

(56) References Cited

U.S. PATENT DOCUMENTS

| | | | | |
|---|---|---|---|---|
| 4,575,817 A * | 3/1986 | Allen et al. | ............. | 710/260 |
| 6,226,097 B1 * | 5/2001 | Kimura | ............. | 358/1.14 |
| 6,349,304 B1 * | 2/2002 | Boldt et al. | ............. | 1/1 |
| 6,906,813 B1 * | 6/2005 | Tuchitoi et al. | ............. | 358/1.14 |
| 7,093,046 B2 * | 8/2006 | Keeney et al. | ............. | 710/220 |
| 7,167,260 B2 * | 1/2007 | Iwata et al. | ............. | 358/1.15 |
| 7,253,920 B2 * | 8/2007 | Hosoda | ............. | 358/1.9 |
| 7,355,731 B2 * | 4/2008 | Kidani et al. | ............. | 358/1.14 |
| 7,362,456 B2 * | 4/2008 | Wanda | ............. | 358/1.14 |
| 7,382,477 B2 * | 6/2008 | Wanda | ............. | 358/1.15 |
| 7,382,484 B2 * | 6/2008 | Matsukubo et al. | ............. | 358/1.15 |
| 7,426,046 B2 * | 9/2008 | Shirai et al. | ............. | 358/1.13 |
| 7,440,709 B2 * | 10/2008 | Mima et al. | ............. | 399/82 |
| 7,495,790 B2 * | 2/2009 | Oono | ............. | 358/1.15 |
| 7,499,191 B2 * | 3/2009 | Han et al. | ............. | 358/1.15 |
| 7,538,902 B2 * | 5/2009 | Kurotsu et al. | ............. | 358/1.16 |
| 7,567,360 B2 * | 7/2009 | Takahashi et al. | ............. | 358/1.15 |
| 7,583,400 B2 * | 9/2009 | Yagita | ............. | 358/1.15 |
| 7,649,645 B2 * | 1/2010 | Frankel | ............. | 358/1.16 |
| 7,697,861 B2 * | 4/2010 | Shindo et al. | ............. | 399/82 |
| 7,716,318 B2 * | 5/2010 | Kaneko | ............. | 709/223 |
| 8,064,081 B2 * | 11/2011 | Sumita et al. | ............. | 358/1.15 |
| 2002/0163666 A1 * | 11/2002 | Iwata et al. | ............. | 358/1.15 |
| 2004/0021903 A1 * | 2/2004 | Wanda | ............. | 358/1.15 |
| 2004/0137855 A1 * | 7/2004 | Wiley et al. | ............. | 455/88 |
| 2004/0145776 A1 * | 7/2004 | Azami | ............. | 358/1.15 |
| 2004/0148335 A1 * | 7/2004 | Keeney et al. | ............. | 709/201 |
| 2004/0190052 A1 * | 9/2004 | Sando | ............. | 358/1.15 |
| 2004/0190057 A1 * | 9/2004 | Takahashi et al. | ............. | 358/1.15 |
| 2004/0263898 A1 * | 12/2004 | Ferlitsch | ............. | 358/1.15 |

(Continued)

FOREIGN PATENT DOCUMENTS

| | | |
|---|---|---|
| EP | 1501008 A2 | 1/2005 |
| JP | 2001-008181 A | 1/2001 |

(Continued)

*Primary Examiner* — Marcus T Riley
(74) *Attorney, Agent, or Firm* — Canon U.S.A., Inc. IP Division

(57) ABSTRACT

A printing device monitoring method includes sequentially registering, in a monitored device queue, printing devices to which print jobs are to be output, monitoring the printing devices in accordance with the order of registration in the monitored device queue, determining if predetermined conditions are satisfied (S1803), interrupting monitoring of a printing device on the basis of the determination (S1806), and re-registering, in the monitored device queue, the printing device whose monitoring was interrupted.

13 Claims, 25 Drawing Sheets

(56) References Cited

U.S. PATENT DOCUMENTS

| | | | |
|---|---|---|---|
| 2005/0024664 A1* | 2/2005 | Schmidt | 358/1.13 |
| 2005/0128505 A1* | 6/2005 | Shirai et al. | 358/1.14 |
| 2005/0141007 A1* | 6/2005 | Shirai et al. | 358/1.13 |
| 2005/0141013 A1* | 6/2005 | Kikuchi et al. | 358/1.14 |
| 2005/0206938 A1* | 9/2005 | Oono | 358/1.13 |
| 2005/0281566 A1* | 12/2005 | Kaneko | 399/8 |
| 2006/0114499 A1* | 6/2006 | Sumita et al. | 358/1.15 |
| 2007/0109586 A1* | 5/2007 | Yamada et al. | 358/1.14 |
| 2007/0186278 A1* | 8/2007 | Fujii et al. | 726/5 |
| 2008/0151304 A1* | 6/2008 | Matsugashita | 358/1.18 |

FOREIGN PATENT DOCUMENTS

| | | |
|---|---|---|
| JP | 2001-290623 A | 10/2001 |
| JP | 2005-044080 A | 2/2005 |
| JP | 2005-124124 A | 5/2005 |

* cited by examiner

| PLACE IN ORDER | PRINTER NAME | NUMBER OF UNTRANSFERRED JOBS | PRIORITY LEVEL | STATUS | NUMBER OF TRANSFERRED JOBS |
|---|---|---|---|---|---|
| 1 | PRINTER A | 2 | MIDDLE | CONNECTING | 2 |
| 2 | PRINTER B | 3 | MIDDLE | CONNECTING | 1 |
| 3 | PRINTER C | 1 | MIDDLE | CONNECTING | 0 |
| 4 | PRINTER D | 2 | HIGH | AWAITING CONNECTION | 0 |
| 5 | PRINTER F | 3 | MIDDLE | AWAITING CONNECTION | 0 |
| ... | ... | ... | ... | ... | ... |
| N | PRINTER X | 5 | LOW | AWAITING CONFIRMATION | 3 |

FIG. 10

| MANAGEMENT ID | UNIQUE ID | EVENT REGISTRATION | HISTORY MODE |
|---|---|---|---|
| 1 | ce2fe702-db72-446b-9a79-541500dba919 | ON | ON |
| 2 | fde7c052-c838-423b-8d98-c48ac5961aeb | ON | ON |
| 3 | c88a4669-ebf3-4171-86c4-ef59be0ad93a | ON | OFF |
| 4 | 0363169a-aaa1-4899-b4cc-97cf8539355a | ON | OFF |
| 5 | ff7d6d00-ce7d-407b-9e60-57197b43ff99 | ON | ON |
| ... | ... | ... | ... |
| N | 00ff273b-02fd-4611-8ffc-311902b13446 | ON | ON |
| | | | |
| | | | |
| | | | |

FIG. 11

| ORDER | UNIQUE ID | STATUS | JOB INFORMATION |
|---|---|---|---|
| 1 | ce2fe702-db72-446b-9a79-541500dba919 | PRINTING | JOB INFORMATION |
| 2 | ce2fe702-db72-446b-9a79-541500dba919 | TRANSFERRED | JOB INFORMATION |
| 3 | ce2fe702-db72-446b-9a79-541500dba919 | TRANSFERRED | JOB INFORMATION |
| 4 | c88a4669-ebf3-4171-86c4-ef59be0ad93a | TRANSFERRING | JOB INFORMATION |
| 5 | c88a4669-ebf3-4171-86c4-ef59be0ad93a | ON STANDBY | JOB INFORMATION |
| ... | ... | ... | ... |
| N | ff7d6d00-ce7d-407b-9e60-57197b43ff99 | ON STANDBY | JOB INFORMATION |
| | | | |
| | | | |
| | | | |

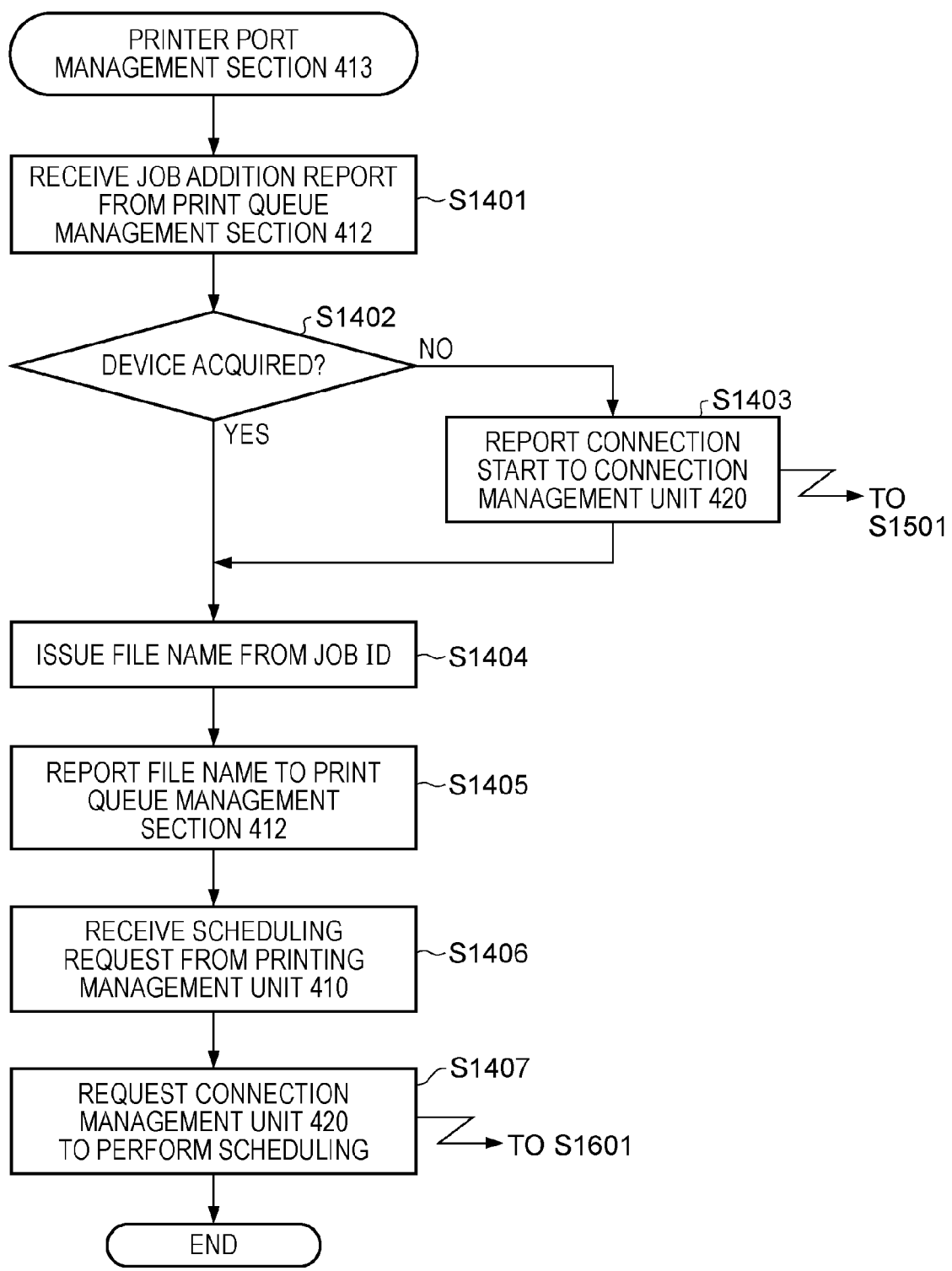

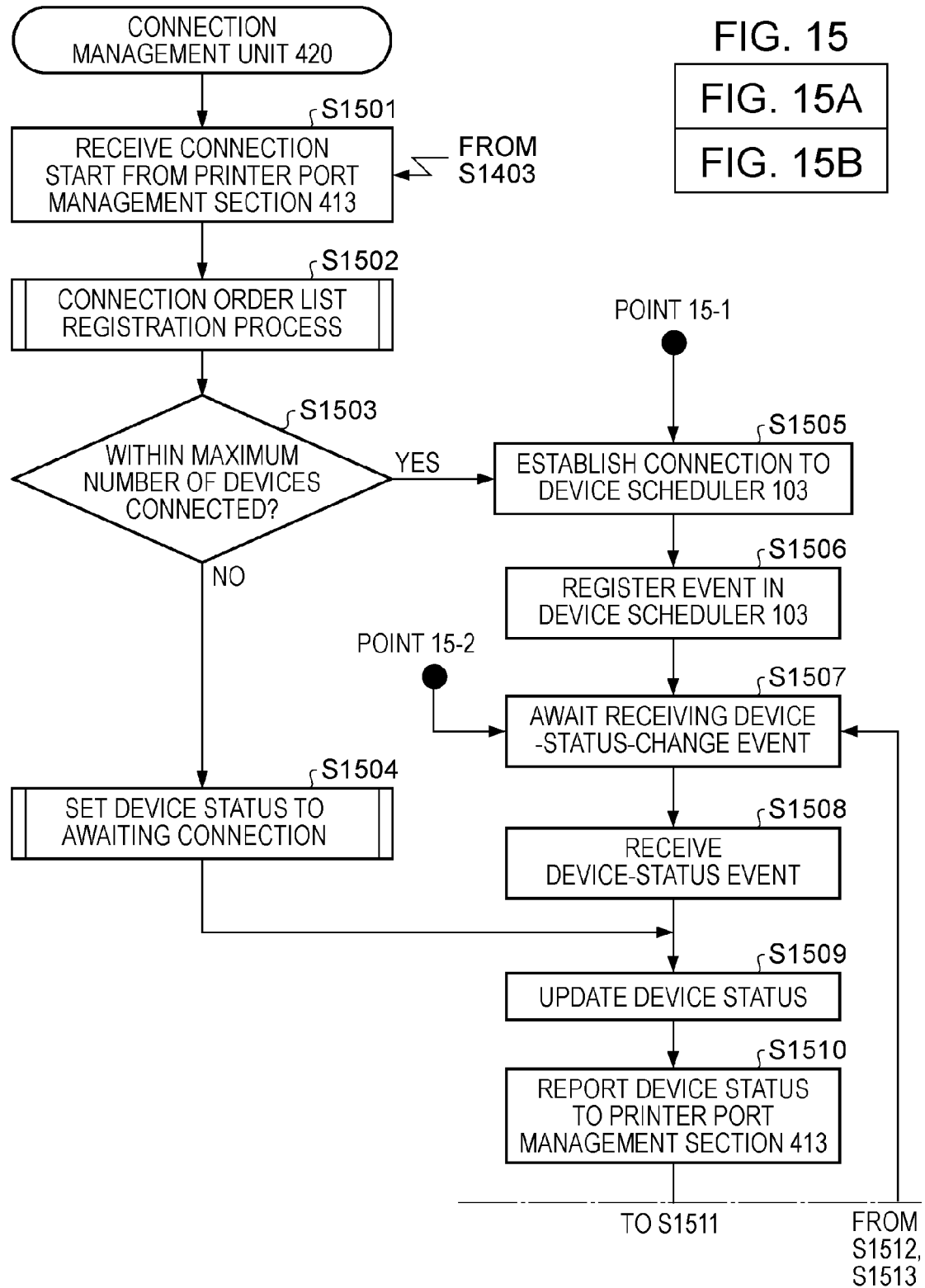

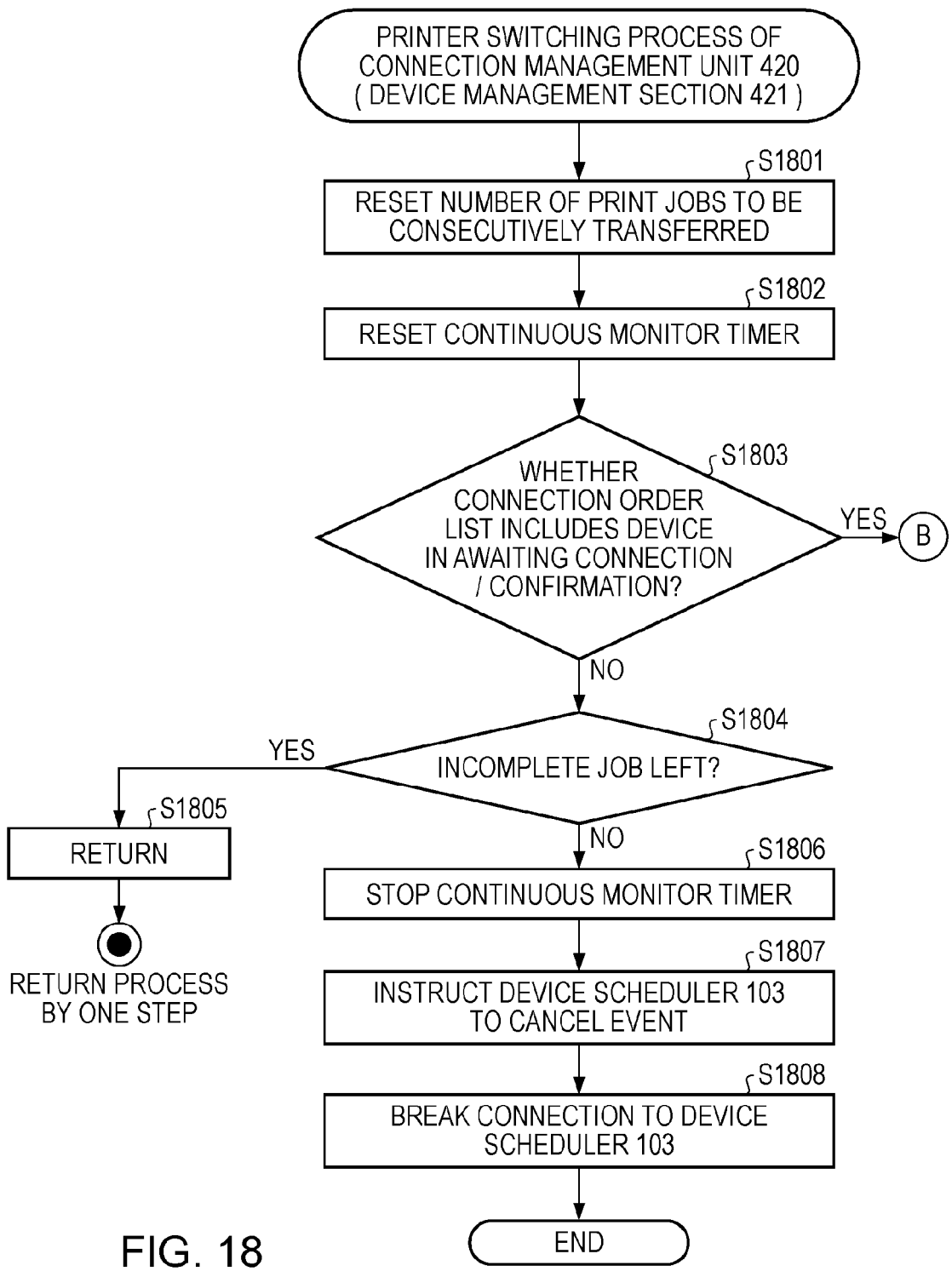

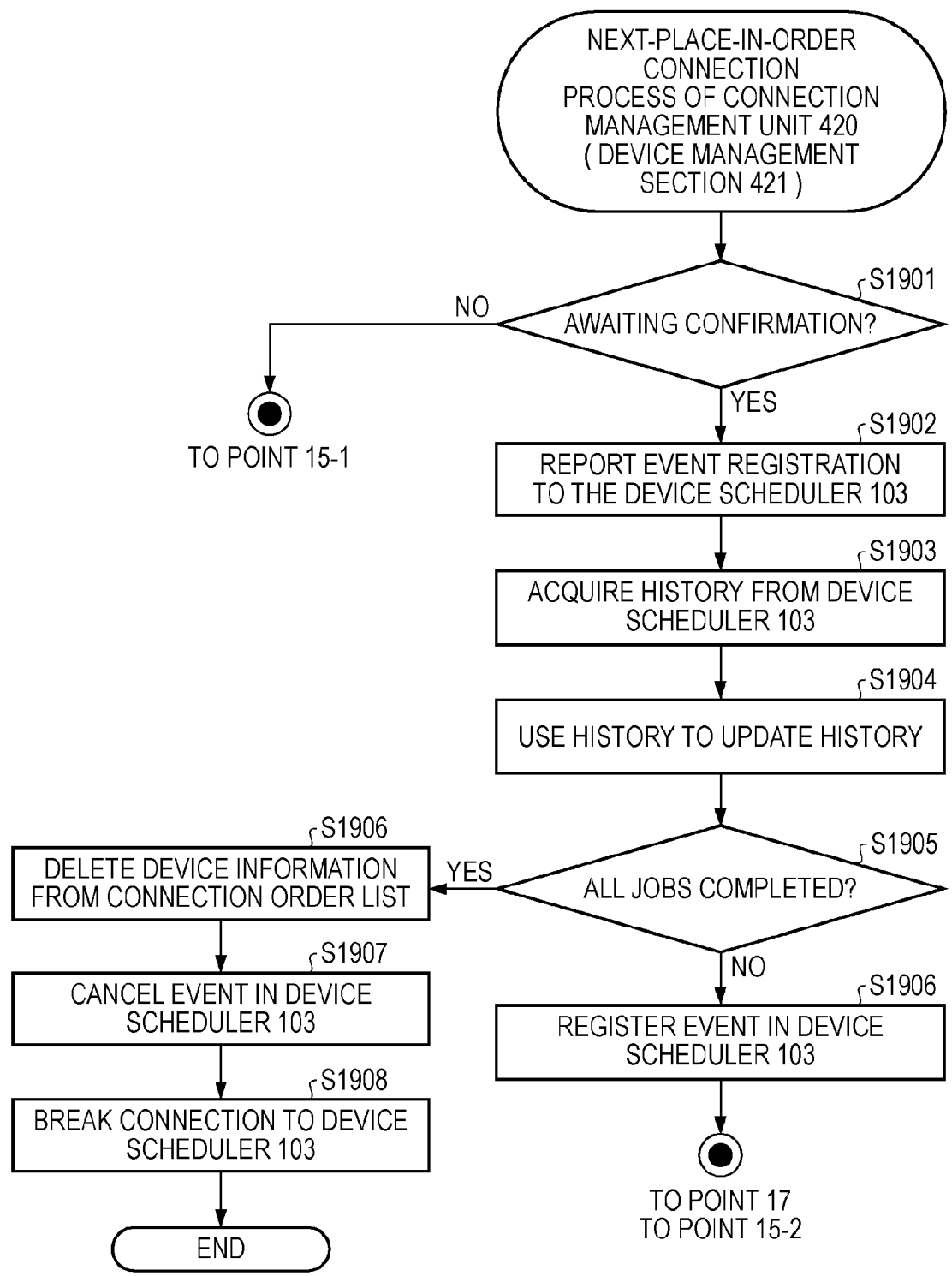

INFORMATION PROCESSING APPARATUS, PRINTING SYSTEM, MONITORING METHOD, PROGRAM, AND STORAGE MEDIUM

BACKGROUND OF THE INVENTION

1. Field of the Invention

The present invention relates to a mechanism for reducing a load on a computer and efficiently managing a print job and a printing device.

2. Description of the Related Art

From Japanese Patent Laid-Open No. 2001-290623, a distributed printing technology for realizing high speed printing with a plurality of printers by distributing print jobs on a network is known. According to Japanese Patent Laid-Open No. 2001-290623, a job issuer, such as a personal computer, collects statuses of the distributed print jobs, and the job issuer manages the statuses of the print jobs in parallel.

However, for example, there is a case in which a large number of print jobs are input to a large number of printing devices at locations mutually connected by a network in various parts of a country. Although several printing devices can be monitored in the technology disclosed in Japanese Patent Laid-Open No. 2001-290623, in the case of monitoring, for example, several hundred printing devices, it is not realistic to use the technology disclosed in Japanese Patent Laid-Open No. 2001-290623 for monitoring. Monitoring of several hundred printing devices causes a very large processing load, or significantly increases the cost required for a computer used for monitoring.

SUMMARY OF THE INVENTION

Embodiments of the present invention are provided to address the above-described drawbacks of the related technology.

According to an aspect of the present invention, an information processing apparatus capable of communicating with a plurality of printing devices is provided. The information processing apparatus includes a registration unit configured to register, in a monitored device queue, among the plurality of printing devices, printing devices to which print jobs are to be output, a monitoring unit configured to monitor the printing devices in accordance with an order of registering the printing devices in the monitored device queue, a determination unit configured to perform a determination of whether or not predetermined conditions are satisfied, and a monitoring interruption unit configured to interrupt monitoring of one printing device among the monitored printing devices on the basis of the determination by the determination unit. The registration unit re-registers, in the monitored device queue, the printing device whose monitoring is interrupted.

According to the information processing apparatus, for example, in cases such as when a very large number of print jobs are input to a plurality of printing devices, a monitoring load on a printing device or print job for monitoring can be reduced, whereby the cost required for a computer does not need to be increased more than necessary.

Further features of the present invention will become apparent from the following description of exemplary embodiments with reference to the attached drawings.

BRIEF DESCRIPTION OF THE DRAWINGS

FIG. 8 is a schematic illustration of the connection order list shown in FIG. 4.

FIG. 10 is a schematic illustration of the connection list shown in FIG. 9.

FIG. 11 is a schematic illustration of the schedule list shown in FIG. 9.

FIG. 14 is a flowchart showing an example of a process of the printer port management section shown in FIG. 4.

FIGS. 15A and 15B are flowcharts showing an example of a process of the connection management unit shown in FIG. 4.

FIGS. 18A and 18B are flowcharts showing an example of a printer switching process of the device management section shown in FIG. 4.

FIG. 19 is a flowchart showing a process of the device management section shown in FIG. 4 when it issues the instruction to start a connection process for the next place of the order.

DESCRIPTION OF THE EMBODIMENTS

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
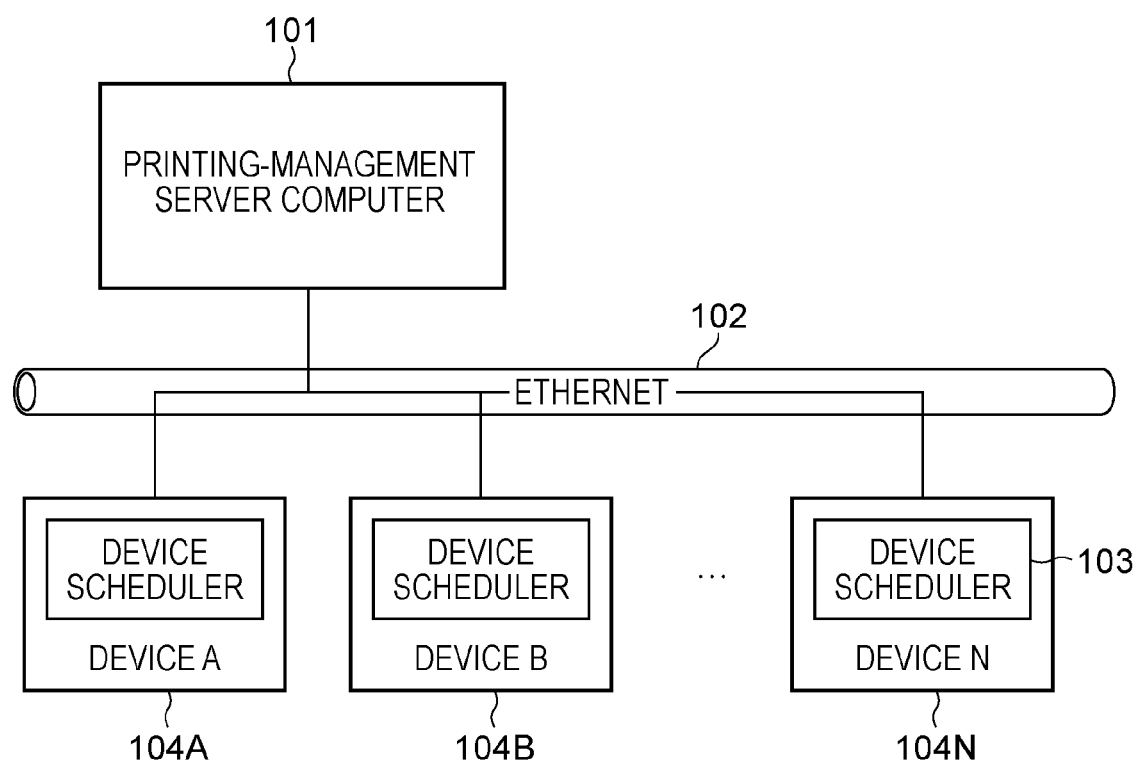
FIG. 1 is a block diagram showing an entire configuration of a printing system according to an embodiment of the present invention.

FIG. 1 is a block diagram showing the configuration of a printing system according to an embodiment of the present invention. In this system, it is assumed that a plurality of network printers be connected. In FIG. 1, devices 104A, 104B, . . . , and 104N are printing devices. The printing devices 104A to 104N are connected to a network 102 (Ethernet) by a network interface (not shown). By analyzing a print job transferred from a printing-management server computer 101, the print job including print data, each device converts the print job into a dot image. The device prints the dot image. The print job represents a generic name including drawing data such as a page description language, and various types of printing-related job-setting data such as print layout settings. In addition, laser-beam printers employing electrophotography, inkjet printers employing inkjet printing, etc., are usable as the devices 104A to 104N, if needed.

The devices 104A to 104N include device schedulers 103 for managing print job schedules, storing print job histories, and managing various print job statuses.

Each device scheduler 103 can be configured by, for example, dedicated hardware. The device scheduler 103 can also be configured by executing an application on a platform (called an "EAP" (embedded application platform)) provided in the device. In addition, the device scheduler 103 can be configured in cooperation between hardware and software. Furthermore, a function equivalent to that of the device scheduler 103 may be realized such that part of processing is executed by an information processing apparatus connected to the devices 104A to 104N so as to communicate with one another. Moreover, the device scheduler 103 may be built into each printing device beforehand, and a function of the device scheduler 103 may be added to the printing device.

The printing-management server computer 101 is connected to the network 102 by a network cable. The printing-management server computer 101 stores files for use on the network, and monitors an operating state of the network 102. The printing-management server computer 101 manages the devices 104A to 104N connected to the network 102. In this construction, the printing-management server computer 101 is a commonly used information processing apparatus, and stores a printing management service in executable form.

Hardware Configuration

Figure 2:
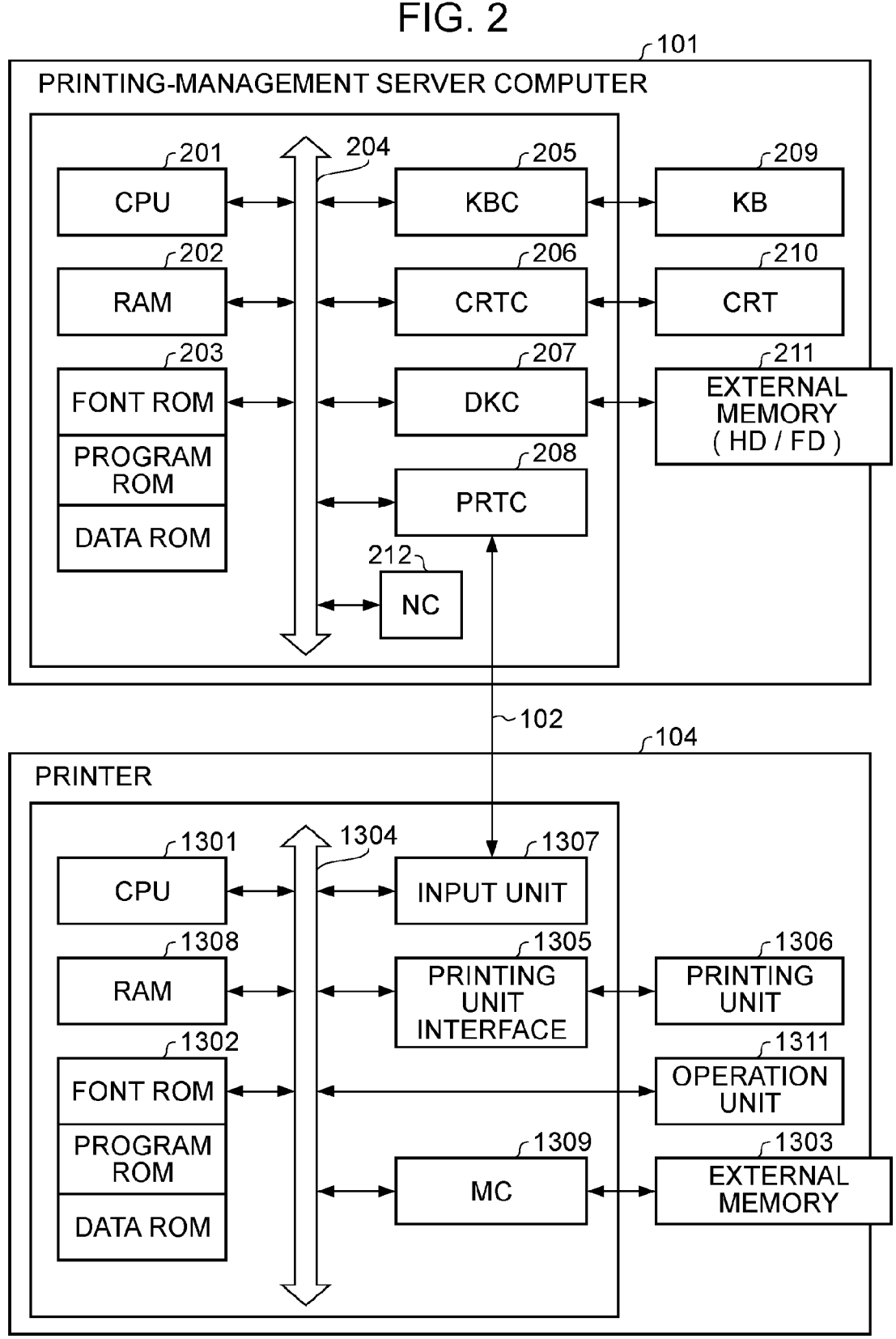
FIG. 2 is a block diagram showing examples of hardware configurations of the printing-management server computer and printing device shown in FIG. 1.

FIG. 2 consists of block diagrams showing hardware configurations of the printing-management server computer 101 and each device 104. FIG. 2 shows the connection between the printing-management server computer 101 and the device 104.

In the printing-management server computer 101, a CPU (central processing unit) 201 executes a program such as an OS (operating system) or application stored in a program ROM (read-only memory) of ROMs 203 or loaded from an external memory 211 (such as an HD (hard disk) or a FD (floppy disk)) to a RAM (random access memory) 202. The following processes (described later) in flowcharts are realized by executing the program. The RAM 202 functions as a main memory, a work area, etc., for the CPU 201. A keyboard controller (indicated by KBC) 205 controls inputting with keys from a keyboard 209 and a pointing device (not shown). A CRT (cathode-ray tube) controller (indicated by CRTC) 206 controls display of a CRT display 210. A disk controller (indicated by DKC) 207 controls accessing of data on the external memory 211, which store various types of data. A printing controller (indicated by PRTC) 208 controls signal exchange between the printing-management server computer 101 and the connected device 104. A network controller (indicated by NC) 212 is connected to the network 102, and executes a process for controlling communication with other devices connected to the network 102. Although the NC 212 is shown separately from the PRTC 208, the NC 212 can be regarded as included in the PRTC 208 since the NC 212 functions as means of network communication with the PRTC 208.

Next, the configuration of the device 104 is described below. As shown in FIG. 2, a CPU 1301 in the device 104 controls each block connected to a system bus 1304 on the basis of control programs stored in ROMs 1302 and an external memory 1303. An image signal generated by processing of the CPU 1301 is output as output information to a printing unit 1306 (printer engine) through a printing unit interface 1305. In addition, the printing unit interface 1305 can communicate with the printing-management server computer 101 through an input unit 1307, and can report information or the like in the device 104 to the printing-management server computer 101.

A program ROM of ROMs 1302 stores a control program, etc. for the CPU 1301. A font ROM of the ROMs 1302 stores font data, etc., for use in generating the output information. A data ROM of the ROMs 1302 stores various types of information for use on the printing-management server computer 101 in the case of a printer including no external memory 1303 such as a hard disk.

A RAM 1308 functions as a main memory, a work area, etc., for the CPU 1301. The RAM 1308 is formed so that its storage size can be increased by using an option RAM connected to an added port (not shown). In addition, the RAM 1308 is used as an output information loading area (bitmap-data loading area), as an environmental data storing area (such as print job settings and print job status information), and as a nonvolatile RAM (NVRAM). Accessing of the external memory 1303, such as the hard disk and an IC (integrated circuit) card, is controlled by a memory controller (MC) 1309. The external memory 1303 is connected as an option, and stores font data, emulation data, form data, etc. An operation unit 1311 includes switches and LED (light-emitting diode) indicators for operations.

Figure 3:
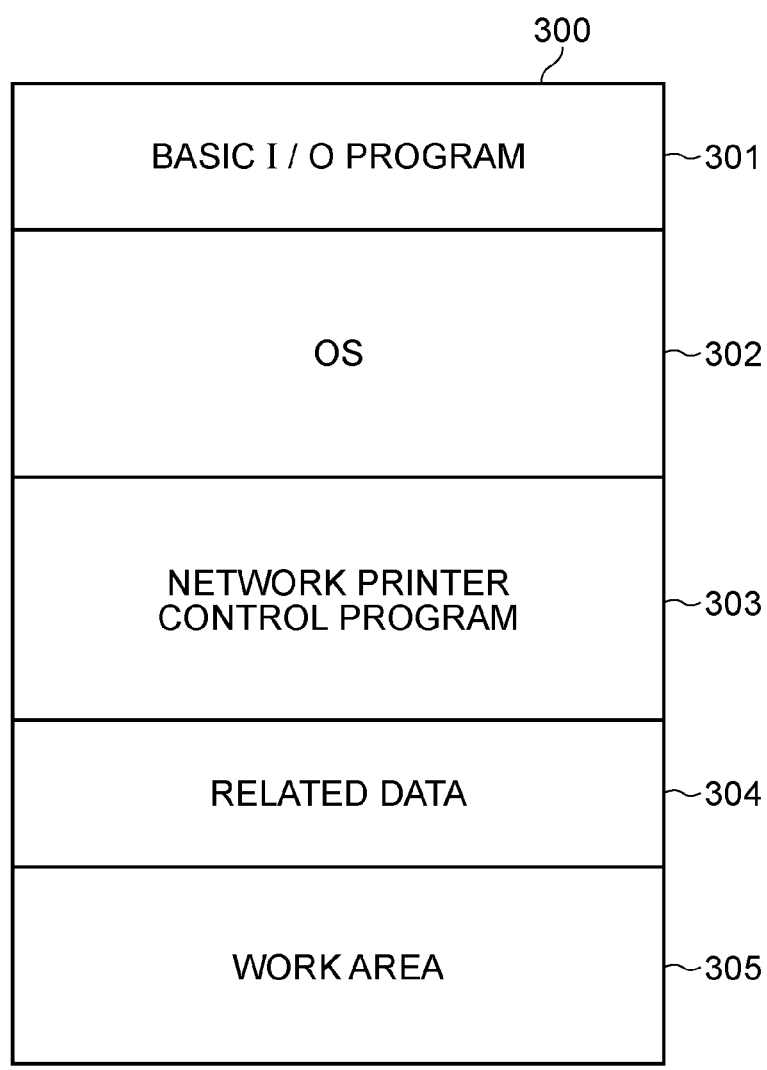
FIG. 3 is an example of a memory map of the RAM shown in FIG. 2.

FIG. 3 is an illustration of an example of a memory map of the RAM 202 shown in FIG. 2. The memory map is in a state in which a printing management service is executable after being loaded into the RAM 202.

The printing management service may be executed after being directly loaded from the external memory 211 into the RAM 202. In addition, by storing the printing management service in the ROMs 203, and configuring the stored printing management service as part of the memory map, the stored printing management service can directly be executed. Alternatively, software for realizing functions equivalent to those of the above devices can be used as a substitution for the devices as hardware.

In the printing-management server computer 101, the printing management service controls transfer of a print job, issuance of an instruction to change a printing destination of the print job, and issuance of an instruction to alter a printing order.

An area 301 is used to store a basic input/output program. The basic input/output program has a function such as an IPL (initial program loading) function in which, when supply of power to the printing-management server computer 101 is turned on, the OS is loaded from the external memory 211 to the RAM 202 and is started to operate.

An area 302 is used to store the OS. An area 303 is used to store the printing management service. An area 304 is used to store related data. An area 305 is a work area and is used for the CPU 201 to execute various programs.

Software Configuration

Figure 4:
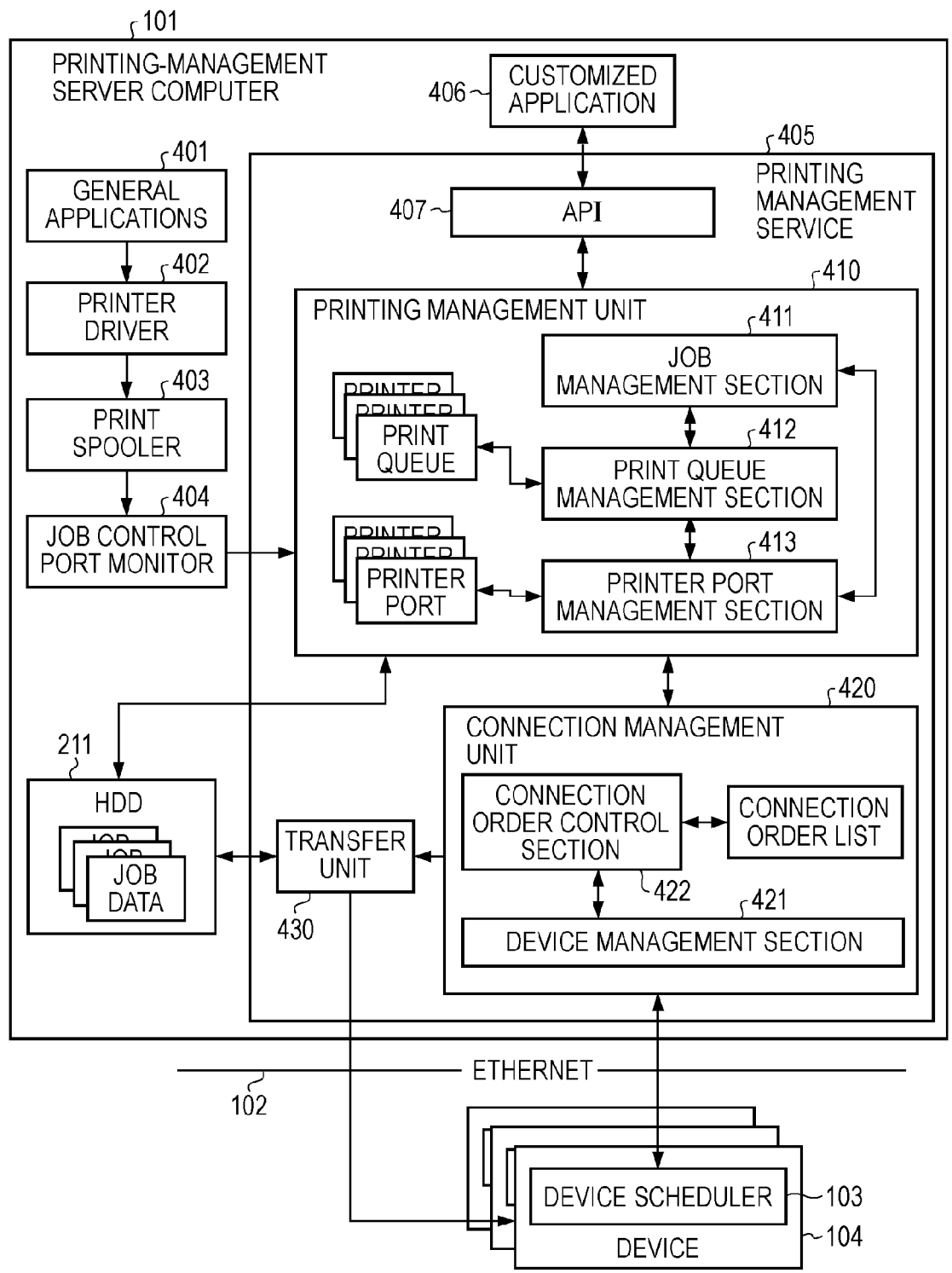
FIG. 4 is a block diagram showing an example of a software configuration of the printing-management server computer shown in FIG. 1.

Next, a software configuration of the printing-management server computer 101 in the printing system is described. FIG. 4 is a block diagram showing an example of a software configuration of the printing-management server computer 101. The software configuration, indicated by blocks, represents functions that are realized such that the CPU 201 in FIG. 2 executes various programs stored in the ROMs 203 and the external memory 211.

A commonly used application, such as Microsoft Word, uses the OS to generate a set of drawing commands when receiving a printing instruction. After receiving the set of drawing commands generated by the OS, on the basis of the set of drawing commands, a printer driver 402 generates a print job including a PDL (page description language) file that can be interpreted by the devices 104A to 104N. When the devices 104A to 104N differ in model, in some cases, the printing-management server computer 101 may include printer drivers 402A to 402N respectively corresponding to the devices 104A to 104N.

The printer driver 402 passes data of the generated print job in order to transfer the print job to the connected device 104. Since, in this embodiment, it is assumed that the OS is Microsoft Windows™, the print spooler 403 is a Windows spooler. The computer OS to which the present invention is applied is not limited to Microsoft Windows. Each of different operating systems is also usable if it has drawing commands.

The print spooler 403 passes the print job to a job control port monitor 404 selected and instructed by a user through a user interface, and allows the job control port monitor 404 to transfer the print job to the devices 104A to 104N.

The following description assumes that the user issues a printing instruction beforehand after designating the job control port monitor 404, which transfers the print job to the printing management service 405.

In addition, printing setting information (such as a sheet size and a stapling instruction) set through a printer driver interface, is also reported to the job control port monitor 404. The job control port monitor 404 reports, to the printing management service 405, not only the print job, which is passed from a higher level, but also the reported print setting information.

The printing-management server computer 101, or a customized application 406 of a different information processing apparatus on the network 102 that can be used by the printing-management server computer 101, inputs a print job to the printing management service 405 through an API (application program interface).

The printing management service 405 includes an API 407 as an interface with an external application, a printing management unit 410, a connection management unit 420, and a plurality of transfer units 430 for transferring the print job to each device. Although these functional blocks are shown as those configured by software, even if some functional blocks are configured by hardware, similar functions can be obtained.

The printing management unit 410 includes a job management section 411 for storing present job circumstances, a print queue management section 412 for managing a plurality of print queues, and a printer port management section 413 for managing a plurality of printer ports. Functions of these sections are described in detail below.

The connection management unit 420 includes a device management section 421 for storing present device status, a connection order control section 422 for managing the connection order for the devices 104A to 104N, and a connection order list for storing the connection order. The connection management unit 420 controls a printer switching process, which is a feature of the present invention. Details of the printer switching process are described below.

Print Queue Information

Figure 5:
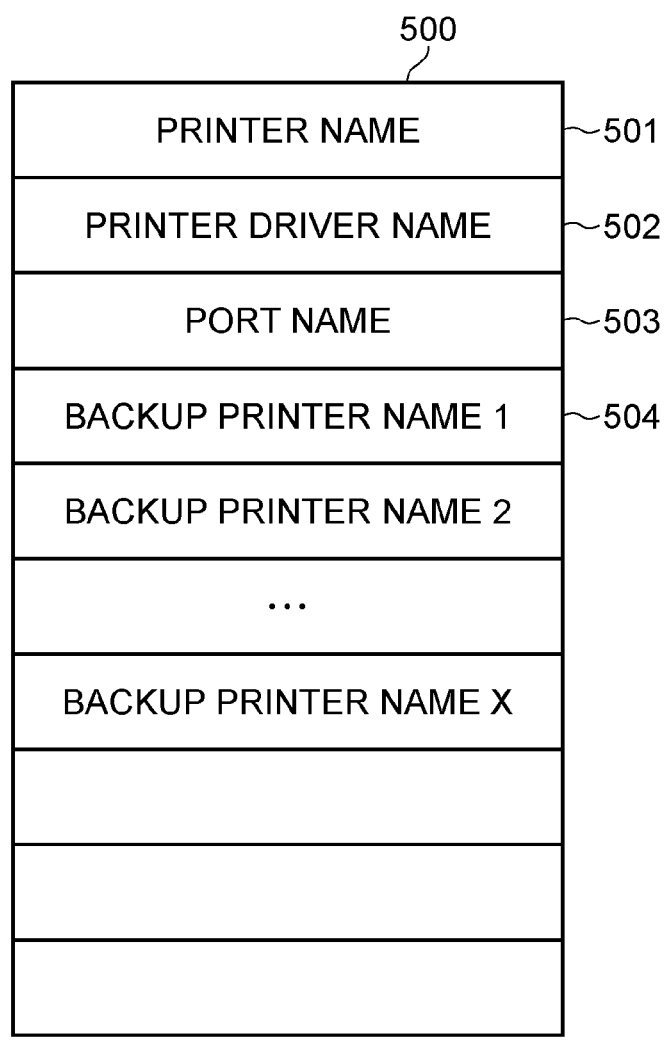
FIG. 5 is a schematic illustration of print queue information.

FIG. 5 is an illustration of print queue information 500 that determines operation of the print job by a print queue (at top left of the printing management unit 410) from the job control port monitor 404. The print queue information 500 is set beforehand correspondingly to the print queue at a given time.

Settings of the print queue information 500, that is, a printer name 501, a printer driver name 502, a port name 503, and backup printer names 504, are described below.

The printer name 501 represents the name of a printer object in Windows. The printer name 501 differs for each printer object and can identify a printer object uniquely. The printer driver name 502 is the name of a printer driver set in the printer object. The port name 503 is the name of a printer port corresponding to the printer name. The backup printer names 504 are used for backup printing in cases such as backup printing and load-distributed printing. As shown in FIG. 5, a plurality of printer names can be registered as the backup printer names 504.

When an error, such as no sheet, occurs in a printing device to which a print job is input, load-distributed printing is performed by using a plurality of backup printers that are set in a print queue which receives the print job and print queue information. Specifically, among a plurality of backup printers set in the print queue which receives the print job and the print queue information, the print job is transferred and moved to a printing device to which the print job can sequentially be transferred, and backup printing is performed. Regarding a method for determining the printing device to which the print job can sequentially be transferred, a printing device that is initially determined as a printing device to which the print job can be transferred, or a printing device in accordance with a predetermined priority level is extracted.

Printer Port Information

Figure 6:
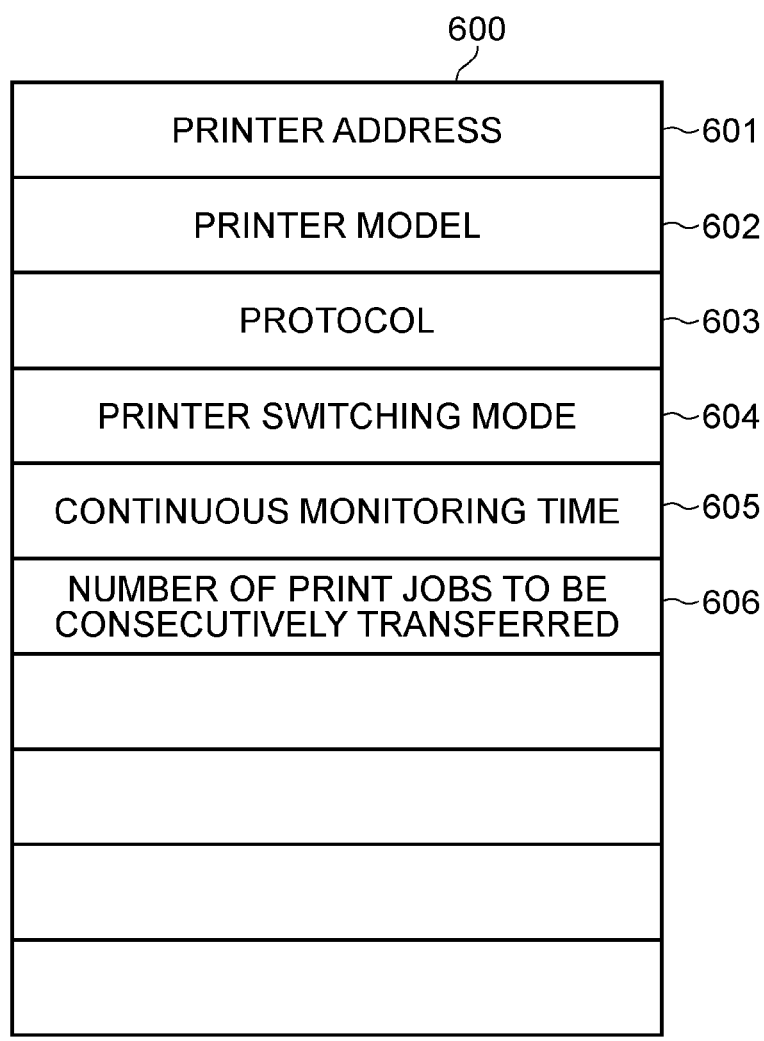
FIG. 6 is a schematic illustration of printer port information.

FIG. 6 shows printer port information 600 determining operation when a print job is transferred to each printer. The printer port information 600 is associated with each printer port at the bottom left of the printing management unit 410 shown in FIG. 4, and is set beforehand at a given time. In addition, the printer port information 600 is set to correspond to the print queue. The settings shown in FIG. 6 can be set for each printer port and for each print queue. A printer address 601 is a network address of a printing device to which the print job is transferred. The printer address 601 is associated with an IP address of a corresponding device or a name used in a DNS (domain name system). The printer model 602 is a printer model name representing a type of a printing device to which the print job is transferred. When differences in operation occur due to printer model differences, definitions for printer models are created to absorb the differences. Details of processing for absorbing the differences are not described for each model. A protocol 603 is a communication protocol used when the print job is transferred to the printing device. Types of the protocol 603 include, for example, a protocol called "LPR" (line printer deamon protocol) for transferring a print job while performing mutual communication, and a RAW protocol for directly transferring a print job.

The printing system has, as characteristic settings, device or job monitoring settings set in the printer port information 600. A printer switching mode 604 is a setting field for printer switching, which is described later with a flowchart. A continuous monitoring time 605 and the number 606 of print jobs to be consecutively transferred are printer switching conditions.

The continuous monitoring time 605 represents an upper limit of time of continuous monitoring of a printing device or print job. The continuous monitoring time 605 can be set to a user's arbitrary value, and is set on the basis of a value input through a setting user interface (not shown) provided by the customized application 406.

The number 606 of print jobs to be consecutively transferred represents a condition indicating how many print jobs are to be consecutively transferred to the same printing device. The number 606 of print jobs to be consecutively transferred can be set to a user's arbitrary value, and is set on the basis of a value input through the setting user interface provided by the customized application 406.

The continuous monitoring time 605 and the number 606 of print jobs to be consecutively transferred are shown as printer switching conditions. The printer switching conditions are not limited thereto. For example, the printer switching conditions may include various and particular conditions such as a print job transfer size.

Job Information

Figure 7:
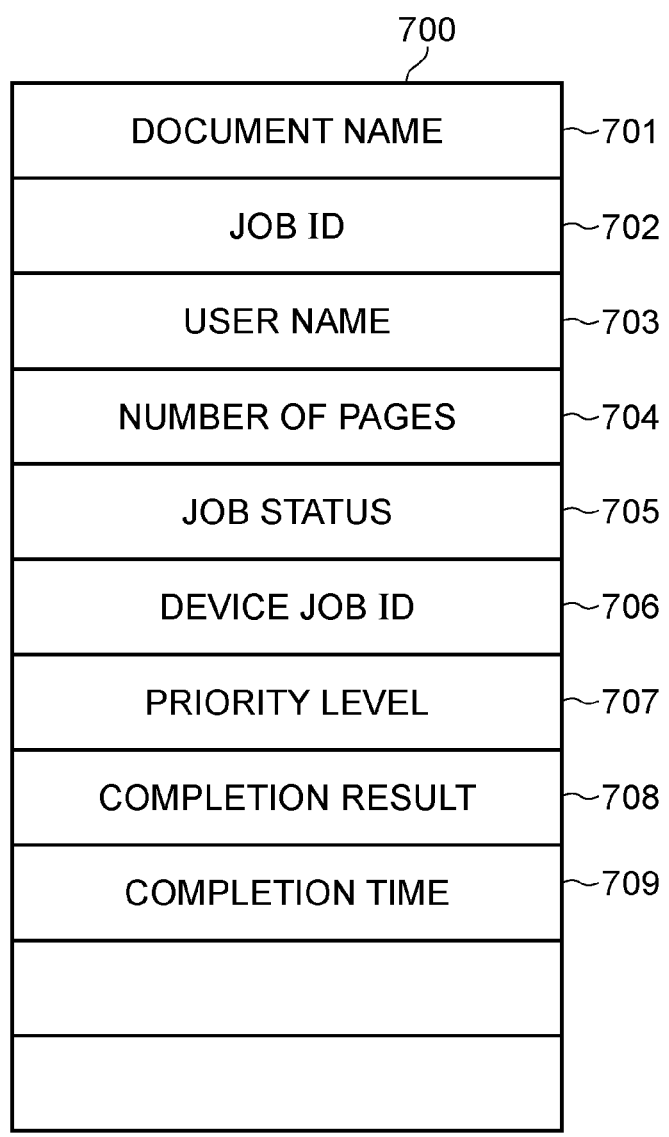
FIG. 7 is a schematic illustration of job information.

FIG. 7 shows job information 700 of the print job input from one general application 401 or the customized application 406. The job information 700 is stored in the external memory 211 and is managed by the job management section 411.

When the print job is input from the customized application 406, the print job is input to the printing management unit 410 via the API 407. In addition, when the print job is input from one general application 401, the print job is input to the printing management unit 410 via the job control port monitor 404. When the print job is input to the printing management unit 410, the printing management unit 410 generates the job information 700, which corresponds to the input print job, and registers the job information 700 in a print queue. Substantial data of the print job is associated with the job information 700, and is stored in the external memory 211.

The job information 700 includes a document name 701, a job ID 702 issued by the printing management service, a user name 703 who performs printing, the number 704 of pages, and a job status 705. The job information 700 also includes a device job ID 706 generated by a printing device, a priority level 707 determining a scheduling order, a completion result 708, and a completion time 709.

Depending on the job status at that time, the job status 705 represents one of statuses such as, for example, a spooling status, a transferring status, a printing status, a pause status, and completion of printing.

Connection Order List

FIG. 8 shows the connection order list 800 shown in FIG. 4. In the connection order list 800, identifiers of printing devices to be monitored and pieces of information of the devices are registered basically in a FIFO (first-in first-out) form. The connection order list 800 or settings based on the connection order list 800 may also be called a "monitored device queue" since the connection order list 800 or the settings based thereon are used to manage an order of devices monitored by the printing-management server computer 101. In accordance with an order of the devices registered in the connection order list 800, the printing-management server computer 101 executes sequential monitoring of device statuses.

The term "connection" represents establishment of a communication session on the basis of management by the connection management unit 420. In the communication session, various statuses can be acquired and requesting or the like can be performed. In addition, interruption of monitoring of the printing devices represents breaking an established communication session. The connection order list 800 shown in FIG. 8 is updated in step S1502 in FIG. 15A (described later).

As horizontal items of the connection order list 800, a printer name of a printer to be connected, the number of untransferred print jobs registered in each print queue, a priority level of connection, a status of connection, and the number of print jobs transferred in the present connection are set. As shown in FIG. 8, in the first to third places in the order of connection, the printing-management server computer 101 is currently connected to printing devices, and, in the fourth and subsequent places in the order of connection, the printing-management server computer 101 awaits connection. In addition to the currently connected status and the status of awaiting connection, there is a status of "AWAITING CONFIRMATION". The status of "AWAITING CONFIRMATION" is, in broad sense, included in the status of awaiting connection.

The connection management unit 420 determines the order of connection on the basis of the information registered (set) in the connection order list 800. Details of the determination are described later.

Functions of Printing Device

Figure 9:
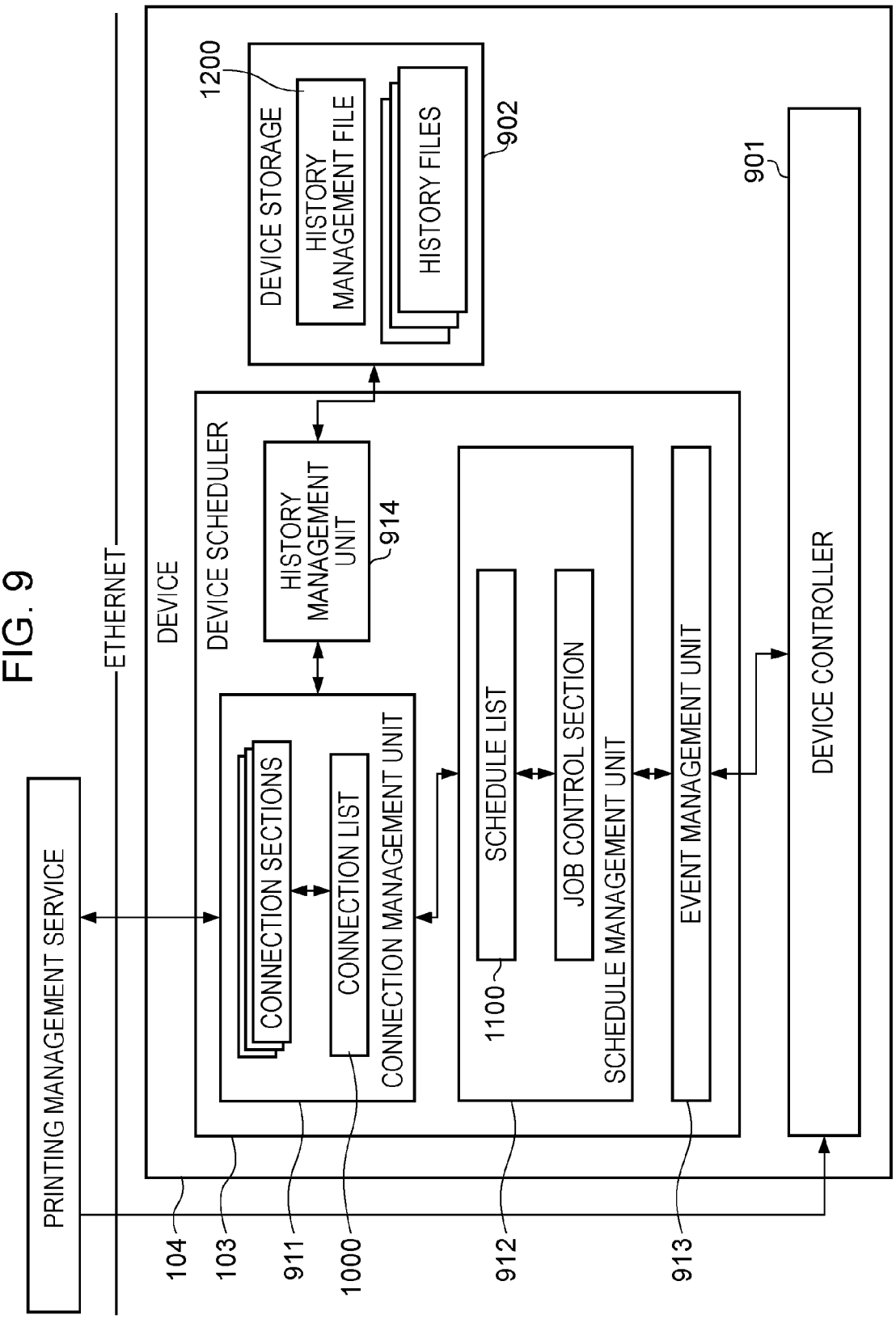
FIG. 9 is a block diagram showing examples of configurations of the device scheduler and printing device shown in FIG. 4.

FIG. 9 shows an example of the configuration of each of the devices 104A to 104N shown in FIG. 1. In FIG. 9, both hardware blocks and software blocks are shown and indicate particular functions of the device.

A device controller 901 is a module for controlling the device. The device controller 901 manages and controls the hardware state and the status of an input print job. The device controller 901 corresponds to the CPU 1301 and printing unit interface 1305 described with reference to FIG. 2. In a case in which the device is a multifunction machine called an "MFP" (multifunction printer) that has a plurality of functions such as printing, copying, fax, and scanning, the device controller 901 corresponds to a module for managing and controlling all the functions in an integrated manner.

The device storage 902 is a permanent storage area or device that is included in the printing device or that is connected to the printing device so that mutual communication can be performed. The device storage 902 is realized by a storage unit such as a RAM or a HDD.

As described above, each of the devices 104A to 104N includes a device scheduler 103 for managing a print job schedule, and storing and managing the print job history (described later). The device scheduler 103 includes a connection management unit 911, a schedule management unit 912, an event management unit 913, and a history management unit 914.

The connection management unit 911 includes a plurality of connection sections for communicating with the printing management service 405, a connection list 1000 (described later) for storing connection circumstances with the printing management service 405, and event information registered by the printing management service 405.

The schedule management unit 912 is a portion for managing a list of print jobs received from the printing management service 405. The schedule management unit 912 includes a schedule list 1100 (described later), and a job control section for controlling the print jobs. The schedule management unit 912 schedules the print jobs.

The event management unit 913 stores the hardware state held by the device controller 901, receives a change in hardware state from the device controller 901, and reports information to the printing management service 405 (connected to the device 104) via the schedule management unit 912 and the connection management unit 911.

The event management unit 913 receives a change in print job status in the device controller 901, and reports the change to the schedule management unit 912. When the change is reported, the schedule management unit 912 updates the job status included in the schedule list, and requests the connection management unit 911 to report to the printing management service 405 (connected to the device 104).

The history management unit 914 is a module for managing print job completion histories. The history management unit 914 is instructed by the connection management unit 911 to generate, read/write, and delete history files in the device storage 902. The history files are managed by a history management file operated by the history management unit 914. Details of management of the print job histories are described later.

Each of the devices 104A to 104N also includes, for example, a printer engine for forming an image on a recording medium and a sensor mechanism for detecting various pieces of printer engine information, which are not shown in FIG. 9. The printer engine, etc., are as described with reference to FIG. 3.

Connection List 1000 in Device

FIG. 10 shows an example of the connection list 1000 generated by the connection management unit 911. In the connection list 1000, unique IDs of computers that are connected to the device 104 by performing a communication session are registered. One of the computers (unique IDs) is the printing-management server computer 101 shown in FIG. 1. It is noted that the order of registering the computers in the connection list 1000 does not define a printing order. The printing order is determined on the basis of a schedule list 100 (described later). The connection list 1000 is specifically described below.

The connection list 1000 includes a management ID, a unique ID reported by the printing management service, an event registration field for setting whether to request an event reported by the device controller 901, and a history mode field for setting whether to use a print job history function. The following description is based on assumption of settings using the history function.

In this embodiment, a 32-digit hexadecimal numeric value called a "UUID" (universally unique identifier) is used. However, any technique can be used if a label that can be identified uniquely is applied to each service to which the device 104 connects.

Schedule List 1100 in Device

FIG. 11 shows an example of the schedule list 1100 generated by the schedule management unit 912 of the device 104. The schedule list 1100 in the schedule management unit 912 indicates in what order the print jobs from the computers included in the connection list 1000 are processed. In the schedule list 1100 shown in FIG. 11, in the first to third places in the order, print jobs from the same computer (print job issuer) are registered.

The schedule list 1100 includes a printing order, unique IDs common to those in the connection list 1000, device job IDs reported by the device controller 901, job statuses, and the job information 700 shown in FIG. 7. Items of the schedule list 1100 are scheduled on the basis of the order of receiving schedules and the priority level 707 included in the job information 700.

History Management File in Device

Figure 12:
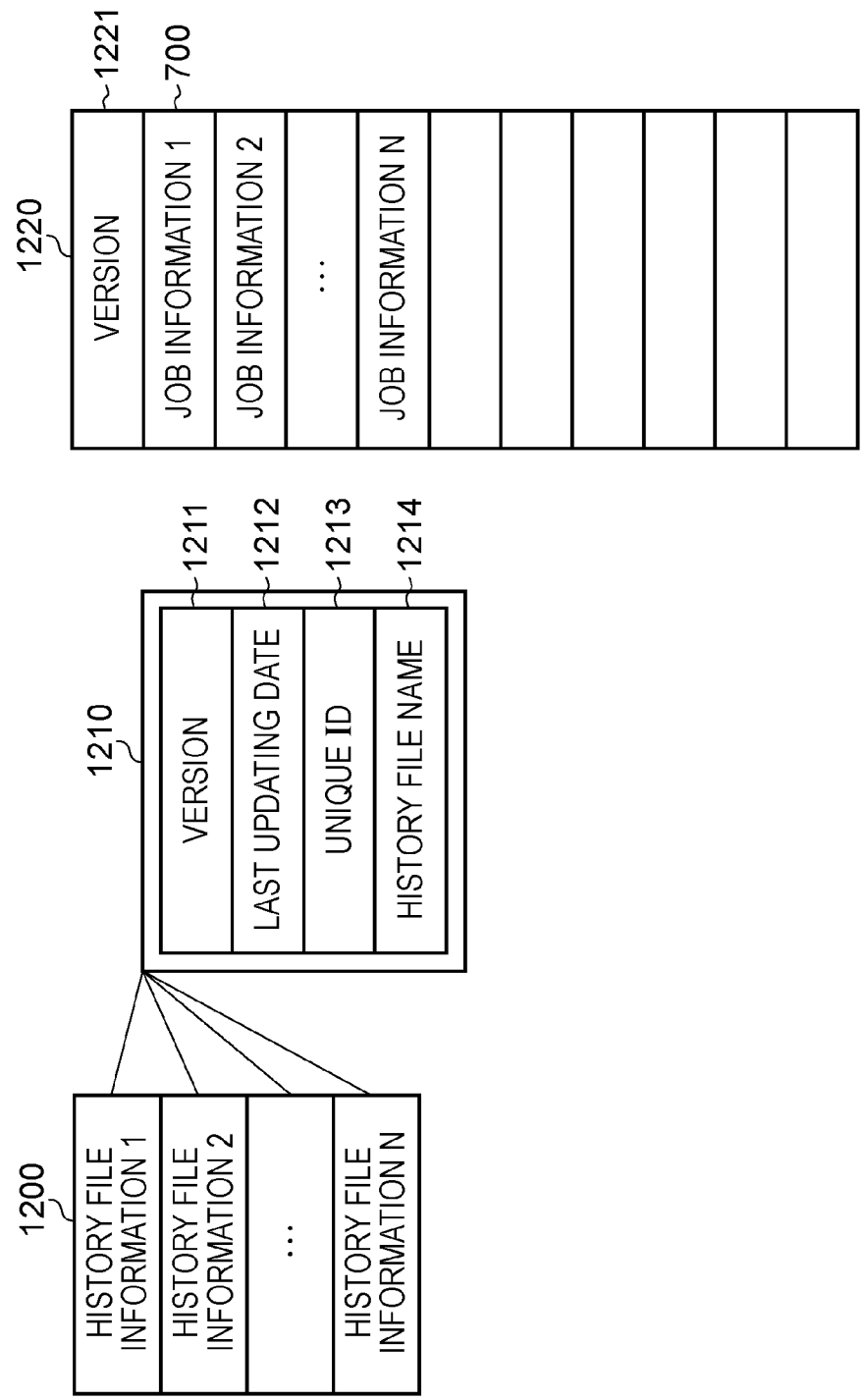
FIG. 12 is a schematic illustration of the history file and history management file shown in FIG. 9.

FIG. 12 shows a history management file 1200 and a history file 1220 that are generated by the history management unit 914 shown in FIG. 9.

The history management file 1200 is a list of pieces of generated history file information 1210. Each piece of history file information 1210 includes a history file version 1211, a last updating date 1212, a unique ID 1213 common to that in the connection list 1000 (FIG. 10), and a history file name 1214 stored in the device storage 902 (FIG. 9). The history file name 1214 functions as information that identifies a history file. The history file includes the version 1221 and a plurality of pieces of the job information 700 shown in FIG. 7.

In this embodiment, the history information shown in FIG. 12 was generated by the device scheduler 103. By detecting a change in printing device in the printing device 104, even if the printing-management server computer 101, to which the change in print job is to be reported, is not currently connected (monitored), appropriate processing can be performed. In other words, since a job status change to be reported is stored, even if the printing-management server computer 101 requests acquisition of a print job status again, the stored job status can be reported.

Execution of Print Job

Next, a feature of the present invention, that is, processing by the printing-management server computer 101 for realizing monitoring of a very large number of printing devices, input of a very large number of print jobs, and tracking to completion, is described.

Figure 13:
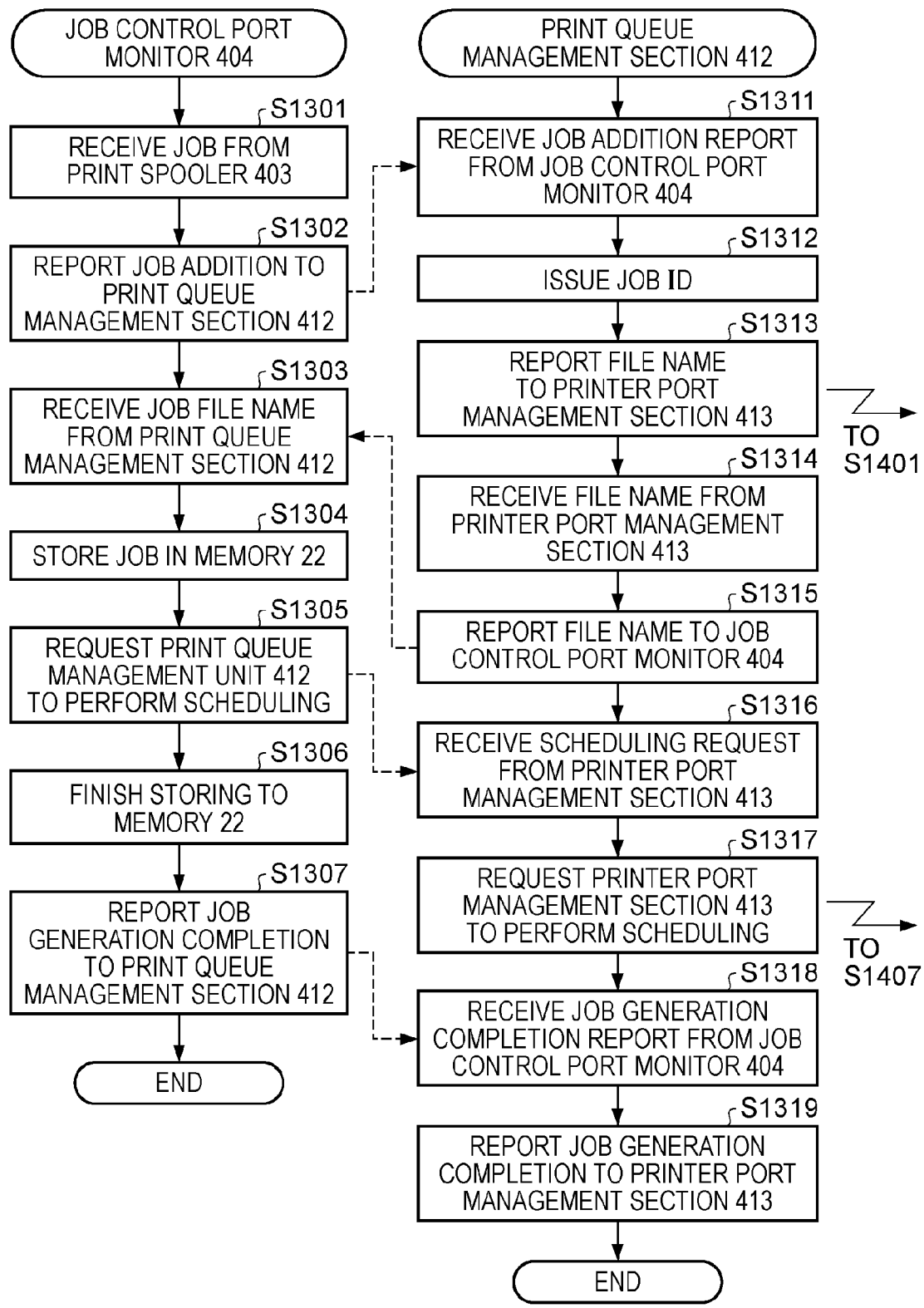
FIG. 13 consists of flowcharts showing examples of processes of the job control port monitor and print queue management section shown in FIG. 4.

First, an outline of the processing is as follows. In response to a print request, the processes shown in FIG. 13 are executed. The job control port monitor 404 calls the print queue management section 412. The print queue management section 412 calls the printer port management section 413, whereby the process shown in FIG. 14 is executed. The processes in FIG. 13 are executable for each print request and for each print port and printer queue.

Figure 15B:
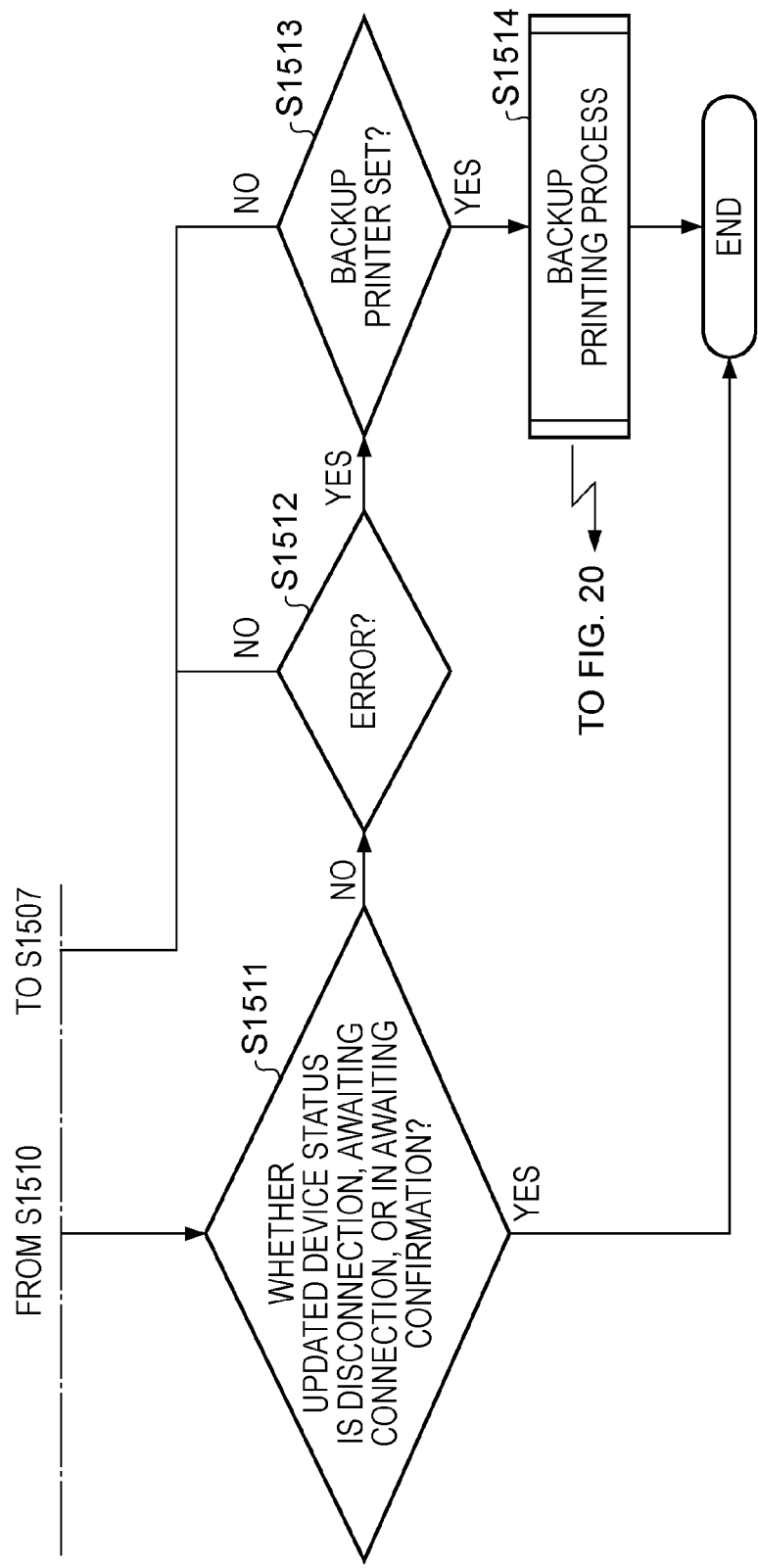
Figure 16:
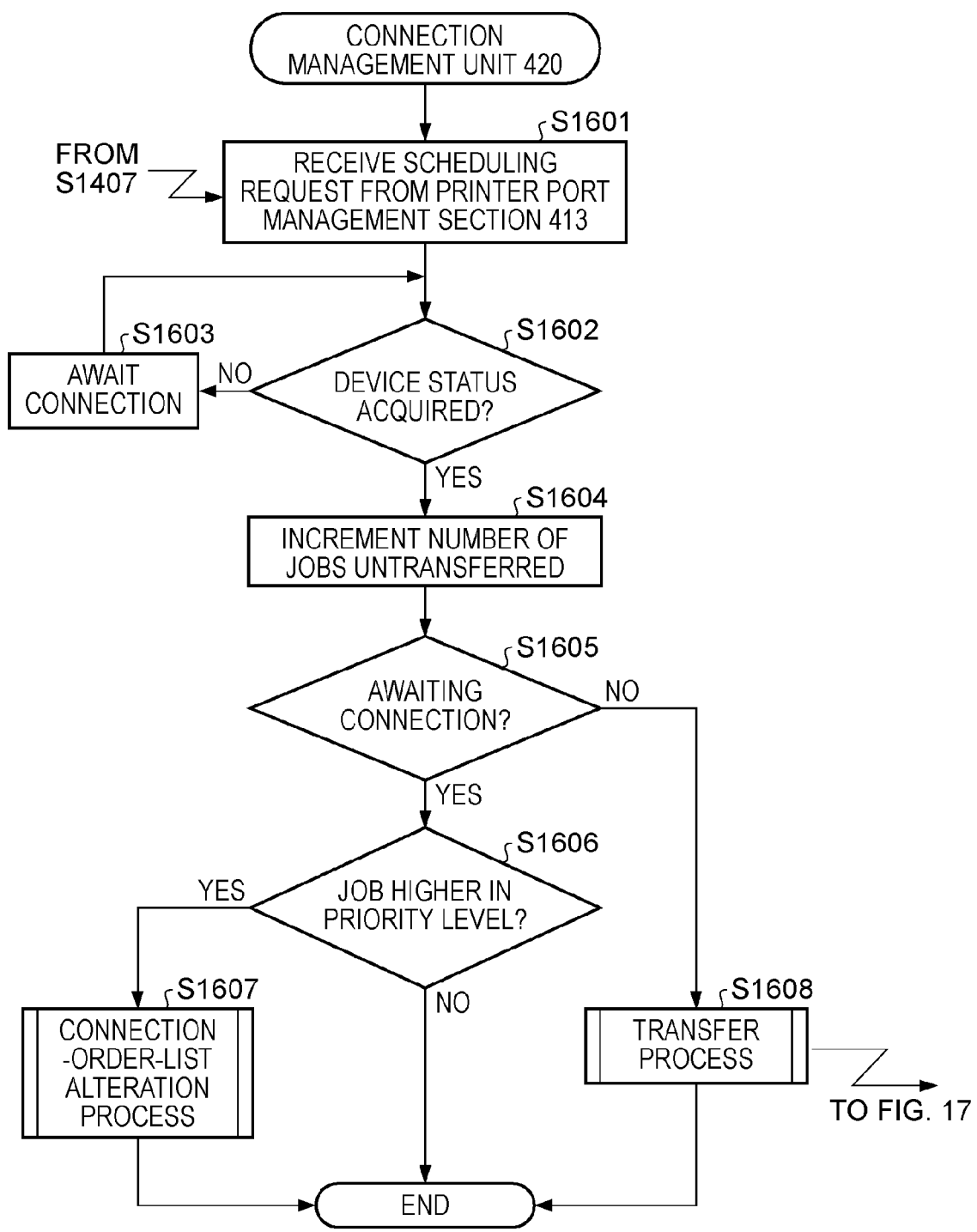
FIG. 16 is a flowchart showing an example of a process of the connection management unit shown in FIG. 4.

In the process in FIG. 14, the printer port management section 413 requests the connection management unit 420 to establish connection to the device 104, whereby the processes shown in FIGS. 15 and 16 are executed by the connection management unit 420.

The connection management unit 420 performs the process in FIGS. 15A and 15B to monitor the status of each connected printing device or candidate printing device to be connected, and performs the process in FIG. 16 to perform print job transfer.

The flowcharts shown in FIGS. 17, 18, and 19 indicate details of the transfer process shown in FIG. 16. On the basis of the processes in FIGS. 17, 18, and 19, the connection management unit 420 determines whether predetermined conditions of various types are satisfied, and performs connected device switching based on device registration to the connection order list 800.

Figure 20:
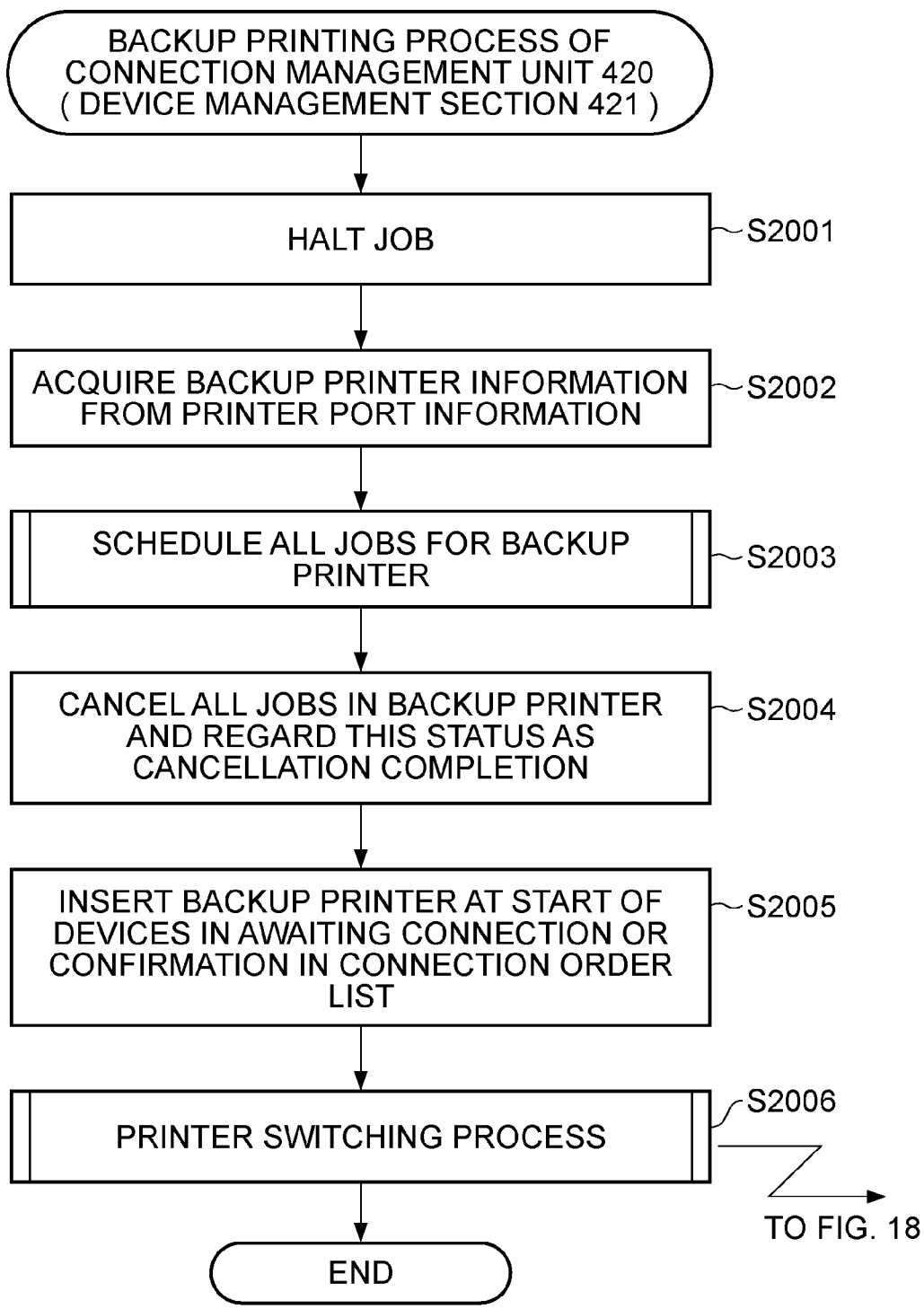
FIG. 20 is a flowchart showing an example of a backup printing process of the device management section shown in FIG. 4.

The flowchart shown in FIG. 20 indicates details of a backup printing process (step S1514) performed on the basis of monitoring (FIGS. 15A and 15B) of each printing device. Details of the above processes are described below.

Process of Printing-Management Server Computer 101

FIG. 13 consists of flowcharts showing processes of the job control port monitor 404 and the print queue management section 412 when a print job is input from the general application 401. In addition, the customized application 406 inputs the generated print job to the print queue management section 412 via the API 407 by performing processing similar to that of the job control port monitor 404.

In step S1301, the job control port monitor 404 receives a print job from the print spooler 403. In step S1302, the job control port monitor 404 reports print job addition to the print queue management section 412. At this time, the job control port monitor 404 reports a printer name. In step S1303, the job control port monitor 404 receives a job file name with a job ID from the print queue management section 412. In step S1304, the job control port monitor 404 stores the print job in the external memory 211 with the designated file name.

In step S1305, the job control port monitor 404 reports a job scheduling request to the print queue management section 412. At this time, the job control port monitor 404 reports the job ID received in step S1303 from the print queue management section 412. After, in step S1306, the job control port monitor 404 finishes storing the job file in the external memory 211, in step S1307, the job control port monitor 404 reports job generation completion to the print queue management section 412 before the process of the job control port monitor 404 in FIG. 13 finishes. Also, at this time, the job control port monitor 404 reports the job ID received in step S1303 form the print queue management section 412.

Turning to the print queue management section 412, after, in step S1311, the print queue management section 412 receives the print job addition report from the job control port monitor 404, in step S1312, the print queue management section 412 issues a job ID. In step S1313, the print queue management section 412 reports the job addition to the printer port management section 413. At this time, the print queue management section 412 reports the issued job ID. In step S1314, the print queue management section 412 receives a job file name from the printer port management section 413, and, in step S1315, reports the job file name to the job control port monitor 404.

After, in step s1316, the print queue management section 412 receives the reported job scheduling request from the job control port monitor 404, in step S1317, the print queue management section 412 reports the job scheduling request to the printer port management section 413. At this time, the print queue management section 412 reports the job ID issued in step S1312 to the printer port management section 413.

After, in step S1318, the print queue management section 412 receives the reported job generation completion from the job control port monitor 404, in step S1319, the print queue management section 412 reports the job generation completion to the printer port management section 413 before the process of the print queue management section 412 finishes. At this time, the print queue management section 412 reports the job ID issued in step S1312.

FIG. 14 is a flowchart showing a process of the printer port management section 413 in a case in which, in step S1313, the print job is input from the print queue management section 412.

After, in step S1401, the printer port management section 413 receives the reported job addition from the print queue management section 412, in step S1402, the printer port management section 413 confirms whether or not a printing device status has already been acquired since the printing device is currently connected to the printing-management server computer 101. When the device status has not already been acquired, that is, when the printing-management server computer 101 is not currently connected to the printing device, in step S1403, the printer port management section 413 reports a connection start to the connection management unit 420. At this time, the printer port management section 413 reports the printer port information 600 based on the printing device 104 designated at the request of printing.

Next, the printer port management section 413 issues a job file name from the job ID received in step S1404. In step S1405, the printer port management section 413 reports the file name, which corresponds to a print job, to the print queue management section 412.

After, in step S1406, the printer port management section 413 receives the reported scheduling request from the print queue management section 412, in step S1407, the printer port management section 413 reports the scheduling request to the connection management unit 420 before the process (FIG. 14) of the printer port management section 413 finishes. At this time, the printer port management section 413 reports the job ID reported from the print queue management section 412 to the connection management unit 420.

FIGS. 15A and 15B show a process of the connection management unit 420 when the connection start is reported by the printer port management section 413.

After, in step S1501, the connection management unit 420 receives the connection start reported by the printer port management section 413, in step S1502, the connection management unit 420 performs a connection order list registration process to register the connection information at the end of the connection order list 800 described with reference to FIG. 8. In step S1502, the connection order list 800 in FIG. 8 is updated. In step S1502, a case in which the connection information is registered at the end of the connection order list 800 is described. However, re-registration to the monitored device list is not limited to this case. The connection information may not be registered at the end of the connection order list 800 if re-connection to the device 104 can be performed. For example, when re-registration is performed, by giving a predetermined priority level to a printing device to be registered, the printing device can be registered at the top position in accordance with the priority level. In addition, when print jobs to be transferred to a designated printing device are sequentially generated on the basis of a print request, pieces of connection information are sequentially registered in the connection order list 800, in which printing devices to which the print jobs are to be output are used in the form of a monitored device queue.

In step S1503, the connection management unit 420 compares the number of connected printing devices in the connection order list 800 (which are connected to the printing-management server computer 101) with a set maximum number of connected printing devices. When the number of connected printing devices reaches the maximum number, in step S1504, the connection management unit 420 sets the device status to "AWAITING CONNECTION" before proceeding to step S1509. Alternatively, when the number of connected printing devices does not reach the maximum number, the device management section 421 executes connection. The maximum number of connected printing devices is determined in accordance with a predetermined number that is set beforehand through the user setting interface by the user.

After the device management section 421 starts connection, in step S1505, the device management section 421 reports the connection to a device scheduler 103 corresponding to the printer port. At this time, the device management section 421 reports a set unique ID to the device scheduler 103. After the connection is successful, in step S1506, the device management section 421 registers an event in the device scheduler 103. In step S1507, the device management section 421 awaits receiving a device status change event reported by the device scheduler 103.

After the device management section 421 acquires the device status change event from the device scheduler 103 in step S1508, or sets the device status to "AWAITING CONNECTION" in step S1504, in step S1509, the device management section 421 updates the device status. In step S1510, the device management section 421 reports the updated device status to the printer port management section 413.

The device status acquisition in steps S1506 and S1507 may be replaced by, for example, polling to the monitored printing devices and awaiting response to the polling. Various device monitoring configurations may be applied to steps S1506 and S1507 if the configurations can monitor various types of information of monitored printing devices registered in the connection order list 800.

In step S1511, the device management section 421 determines whether or not the updated device status represents one of "OFF", "AWAITING CONNECTION", and "AWAITING CONFIRMATION" statuses. If the updated device status represents one of the statuses, the process (FIGS. 15A and 15B) of the connection management unit 420 finishes. A status that is not during connection is triggered by the process shown in FIGS. 18A and 18B, which is described later. If the device status does represent any of the device statuses, in step S1512, the device management section 421 determines whether or not the device status represents an "ERROR" status. The "ERROR" indicates an inability to perform continuous printing out. For example, types of the "ERROR" include running out of supplies such as sheets and toner, a sheet jam, and hang-up of software. If, in step S1512, the device management section 421 has determined that the device status does not represent the "ERROR", the device management section 421 returns to step S1507. Alternatively, if, in step S1512, the device status represents the "ERROR", in step S1513, the connection management unit 420 determines whether or not a backup printer is set in the acquired printer port information. If the backup printer is set, in step S1514, the process of the connection management unit 420 is switched to a backup printing process (described later with reference to FIG. 20) before the process of the connection management unit 420 finishes. If the backup printer is not set, the process returns to step S1507.

FIG. 16 is a flowchart showing a process of the connection management unit 420 when the scheduling request is reported by the printer port management section 413 in accordance with the flowchart of FIG. 14. The reporting of the scheduling request by the printer port management section 413 corresponds to the above-described step S1407 in FIG. 14.

In step S1601, the connection management unit 420 receives the reported schedule from the printer port management section 413. In step S1602, after establishing connection to the device 104, the device management section 421 determines whether or not the device status has already been acquired. More specifically, in step S1602, the device management section 421 determines whether or not the device status represents the "OFF" status. If the device status has not been acquired yet, that is, when the device status represents the "OFF" status, in step S1603, the device management section 421 awaits connection to the device 104. If, in step S1603, the device management section 421 has affirmatively determined, the connection management unit 420 counts up the number of untransferred print jobs in the connection order list 800.

In step S1605, the device management section 421 determines whether or not the device status represents the "AWAITING CONNECTION" status. If the device status represents the "AWAITING CONNECTION" status, in step S1606, the connection management unit 420 confirms a set priority level of the print job, which is to be scheduled. If this print job has a priority level higher than normal, in step S1607, the connection order control section 422 performs a connection-order-list alteration process. In the connection-order-list alteration process, set priority levels of the connection order list 800 for the connection are altered, whereby printing devices in an "AWAITING CONNECTION" list are sorted in the order of priority levels, and the process of the connection management unit 420 finishes. If the print job, which is to be scheduled, has a priority level not greater than normal, the process in FIG. 16 finishes.

In addition, regarding the priority level set in the connection-order-list alteration process performed by the connection order control section 422, a total of the priority levels of all the scheduled print jobs, a maximum priority level among all the priority levels, or the average of all the priority levels can be used. In other words, a behavior is determined depending on for what purpose a connection-order prioritizing condition is set.

If, in step S1605, it is determined that the device status does not represents the "AWAITING CONNECTION" status, in step S1608, the device management section 421 starts a transfer process, which is described later. If the device status represents the "AWAITING CONFIRMATION" status, the device management section 421 affirmatively determines in step S1605. This is because, in a broad sense, the "AWAITING CONFIRMATION" status is identical in meaning to the "AWAITING CONNECTION" status.

Figure 17A:
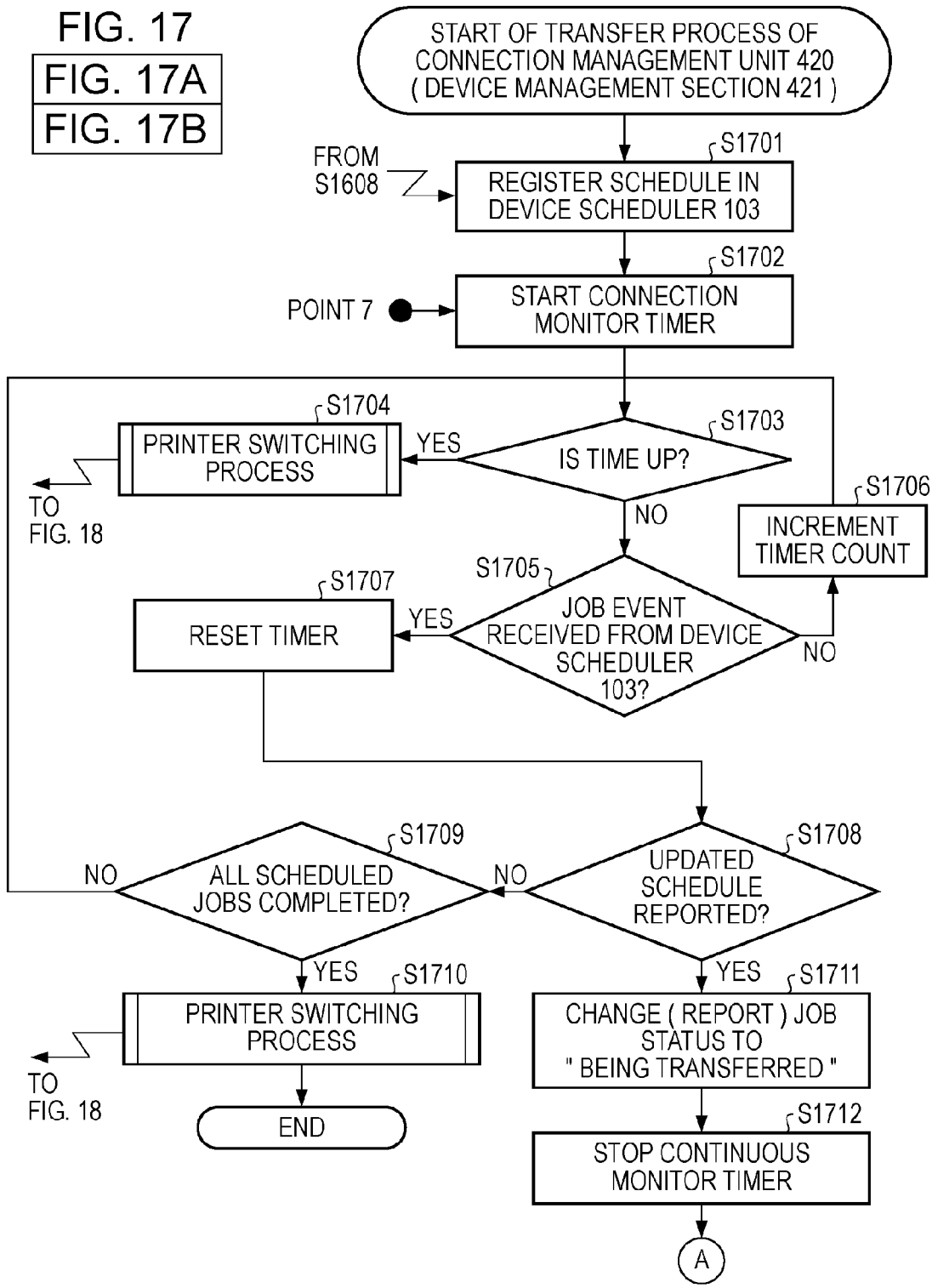
FIGS. 17A and 17B are flowcharts showing an example of a process of the device management section shown in FIG. 4.
Figure 17B:
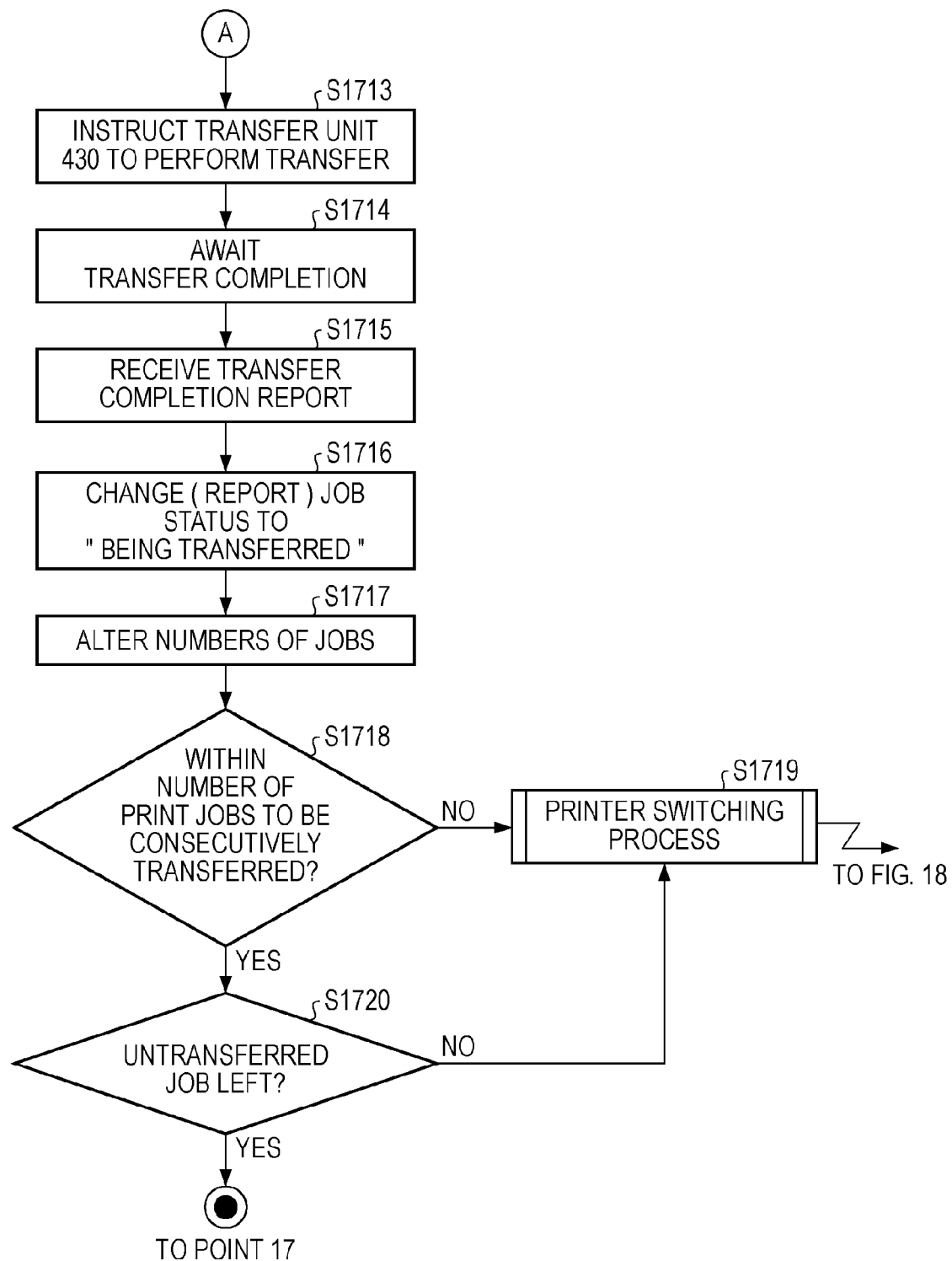

FIGS. 17A and 17B show a process of the device management section 421 when the device management section 421 starts the job transfer process. More specifically, FIGS. 17A and 17B show a process in which, in order to determine whether to interrupt device monitoring, by determining whether a predetermined condition is satisfied, if the printing device condition is not satisfied and the monitored printing device is not changed, print job transfer is performed. The job transfer process is a broad sense term including various types of print job transfer processing such as a process as print job transfer itself, and requesting for print job scheduling.

In step S1701, the device management section 421 reports schedule registration and the job information to the device scheduler 103, which corresponds to the printer port.

Figure 18B:
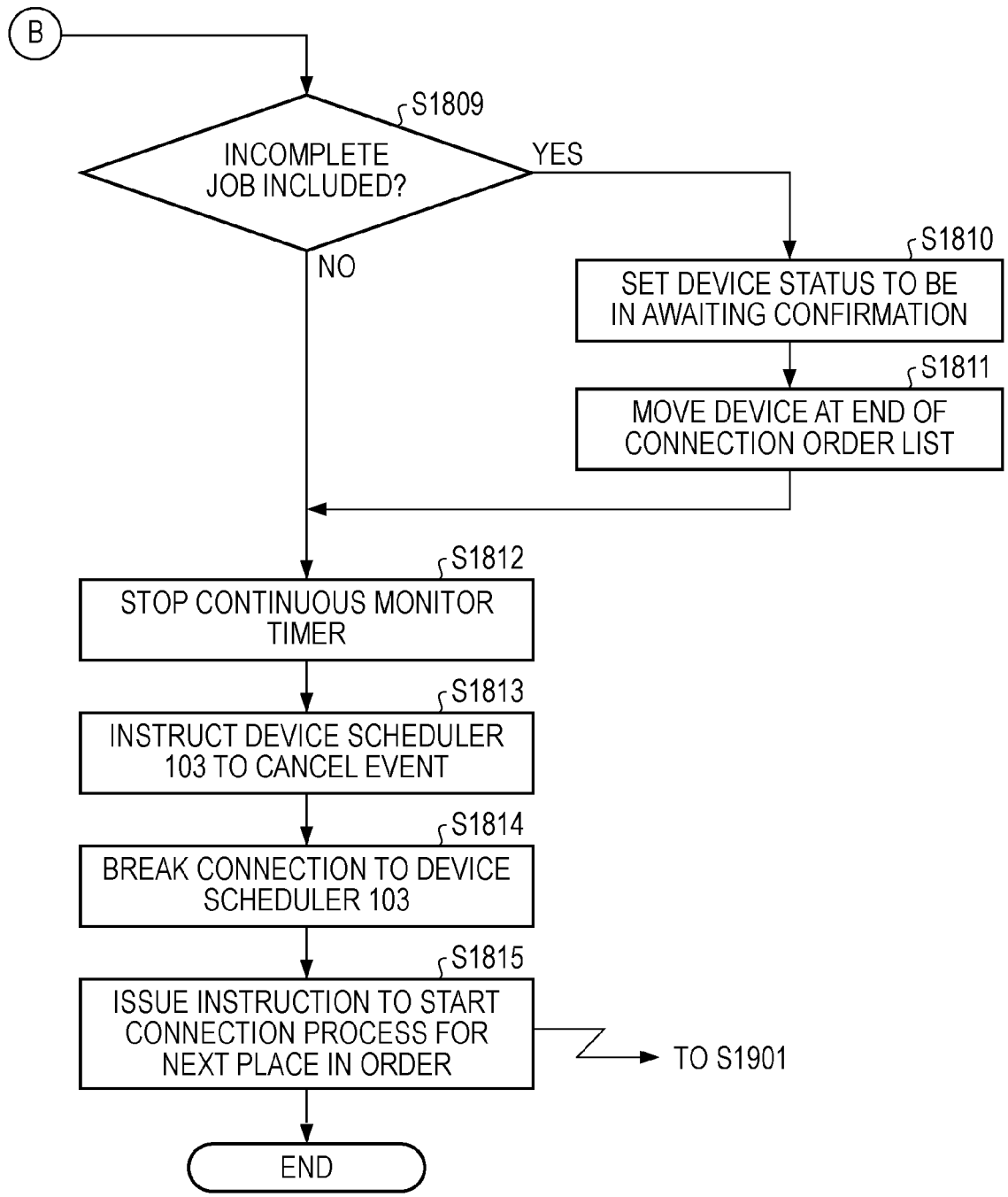

In step S1702, the device management section 421 starts a continuous monitoring timer of the printing device. In step S1703, the device management section 421 determines whether or not a time-out has occurred in the continuous monitoring timer. The determination by the device management section 421 is performed by determining whether or not the continuous monitoring time 605 (that is, the time of continuous monitoring), has passed a threshold value or upper limit. If, in step S1703, the device management section 421 has determined that the time-out has occurred, in step S1704, a printer switching process, which is described later with reference to FIGS. 18A and 18B, is executed in order to interrupt printing device monitoring.

If, in step S1703, the device management section 421 has determined that the time-out has not occurred, in step S1705, the device management section 421 determines whether or not a job status change event has been received from the device scheduler 103. If, in step S1705, it is determined that the device management section 421 has not received the job status change event, in step S1706, the device management section 421 resets the continuous monitoring timer before returning to step S1703.

After, in step S1707, the device management section 421 receives the job status change event from the device scheduler 103 and resets the continuous monitoring timer, in step S1708, the device management section 421 determines whether or not the received event is an updated schedule, that is, printing permission. Until the upper limit of time of continuous monitoring in step S1707 in the above manner has been reached, when a printing device whose monitoring is started reports the device management section 421 that the status of a print job changes, the device management section 421 can return the continuous monitoring time to an initial value, whereby the monitoring can continue.

If the received job status change event is not the updated schedule, in step S1709, the device management section 421 determines whether or not printing based on all the print jobs registered in a print queue has been completed. If a print job whose printing has not been completed is registered, the process returns to step S1703. When printing based on all the print jobs registered in a print queue of interest has been completed, in step S1710, the printer switching process in FIGS. 18A and 18B is performed in order to interrupt printing device monitoring before the process in FIGS. 17A and 17B finishes.

If, in step S1708, the device management section 421 has affirmatively determined that an updated schedule has been reported, in step S1711, the device management section 421 changes the job status to "BEING TRANSFERRED", and reports the printer port management section 413. In step S1712, the print queue management section 412 stops the continuous monitoring timer, then, in step S1713, the print queue management section 412 reports the start of transfer of the print job, and, in step S1714, awaits completion of the transfer. At this time, the device management section 421 reports printer port information of a transfer destination, and a job ID.

After the transfer unit 430 receives the reported start of the transfer from the device management section 421, the transfer unit 430 transfers data of the print job to the device 104 by using a protocol set in the acquired printer port information 600 and the address of the transfer destination. At this time, print job data is identified from the external memory 211 on the basis of the acquired job ID. When the transfer unit 430 completes transfer of data of all the print jobs, the transfer unit 430 reports transfer completion to the device management section 421.

In step S1715, the device management section 421 receives the transfer completion report from the transfer unit 430. Then, in step S1716, the device management section 421 changes the job status to "TRANSFERRED", and reports this change to the printer port management section 413. In step S1717, the number of untransferred print jobs in the connection order list 800 is decremented, and the number of transferred print jobs is incremented.

In step S1718, the device management section 421 compares the incremented number of transferred print jobs with the number 606 of print jobs to be consecutively transferred that is set in the printer port information 600. If, in step S1718, it is indicated that the incremented number of transferred print jobs equals the number of print jobs to be consecutively transferred, the printer switching process in FIGS. 18A and 18B is executed in order to interrupt printing device monitoring. If the number of transferred print jobs is less than the number 606 to be consecutively transferred, the process in FIGS. 18A and 18B is executed. If, in step S1803, if it is determined that the connection order list 800 includes a printing device in awaiting connection/confirmation, in step S1809, the device management section 421 checks whether a candidate printing device to be registered at the end of the connection order list 800 has a print job whose printing has not been completed. If the candidate printing device to be registered at the end of the list has a print job whose printing has not been completed, in step S1811, the candidate printing device is registered at the end of the connection order list 800. In step S1815, the device management section 421 issues an instruction to start a connection process for the next placed device in the connection order list. The next place of the order corresponds to a printing device other than those being connected, that is, the printing device having the fourth place of order from above in FIG. 8. If the incremented number of transferred print jobs is less than the number 606 of print jobs to be consecutively transferred, in step S1720, the device management section 421 determines whether or not an untransferred print job is left. If no untransferred print job is left, the printer switching process in FIGS. 18A and 18B is executed. If, in step S1720, it is determined that an untransferred print job is left, the process returns to step S1702.

FIGS. 18A and 18B are flowcharts showing a process in which, when the printer switching process is started, the device management section 421 interrupts printing device monitoring, and re-registers, in a monitored device queue (the connection order list 800), a printing device whose monitoring was interrupted.

After starting the printer switching process, in step S1801, the device management section 421 resets the number 606 (of print jobs to be consecutively transferred) in the connection order list 800, and, in step S1802, resets the continuous monitoring timer.

In step S1803, the device management section 421 determines whether or not the connection order list 800 includes a printing device whose status is currently "AWAITING CONNECTION" or currently "AWAITING CONFIRMATION". If the connection order list 800 does not include a printing device "AWAITING CONNECTION" or "AWAITING CONFIRMATION", in step S1804, the print queue management section 412 determines whether the print queue includes an incomplete print job. If the print queue includes the incomplete print job, in step S1805, the process returns to a caller of the printer switching process. If the print queue does not include an incomplete print job, in step S1806, the device management section 421 stops the continuous monitoring timer, and, in step S1807, issues an instruction to cancel the event registered in the device scheduler 103. In step S1808, the device management section 421 reports disconnection to the device scheduler 103, and changes the device status to "DISCONNECTION" before the process in FIGS. 18A and 18B finishes.

If, in step S1803, the device management section 421 has determined that the connection order list 800 includes a printing device with status "AWAITING CONNECTION" or "AWAITING CONFIRMATION", in step S1809, the device management section 421 determines whether or not the monitored print queue (whose monitoring is to be interrupted) includes a different print job whose printing has not been completed. If, in step S1809, the device management section 421 has determined that the monitored print queue (whose monitoring is to be interrupted) includes the different print job whose printing has not been completed, in step S1810, the device management section 421 changes the device status to "AWAITING CONFIRMATION", and, in step S1811, moves the printing device to the end of the connection order list 800. Although step S1811 is described as an example of re-registration to the monitored device queue in which the printing device is registered at the end of the monitored device queue, the re-registration is not limited to this example. It is not necessary to register the printing device at the end of the monitored device queue if the printing-management server computer 101 is re-connected to the printing device. For example, a registration form may be used in which, by giving a predetermined priority level to a printing device (to be registered) in the case of re-registration, the printing device is registered at the top of the queue in accordance with the priority level. By using step S1811, a printing device whose monitoring is temporarily interrupted can be re-registered at the end of the monitored device queue (the connection order list 800). Thus, printing device monitoring can be performed in accordance with a registration status of the monitored device queue.

In step S1812, the device management section 421 stops the continuous monitoring timer, and, in step S1813, instructs the device scheduler 103 to cancel the event registered therein in order to interrupt printing device monitoring. In step S1814, the device management section 421 reports disconnection to the device scheduler 103, and, in step S1815, issues an instruction to start the connection process to a printing device in the next place in the order of the connection order list 800.

FIG. 19 is a flowchart showing a process of the device management section 421 when it issues the instruction to start a connection process for the next place in the order. The process in FIG. 19 corresponds to a process in a case in which the connection process is performed again after the printing device monitoring is temporarily interrupted and the printing device is re-registered in the monitored device queue.

In step S1901, the device management section 421 determines whether or not the status of the device in the next place of the order in the connection order list 800 is "AWAITING CONFIRMATION". If the device status is not "AWAITING CONFIRMATION", the process proceeds to point 15-1 (S1505) shown in FIG. 15A. Alternatively, if the device status is "AWAITING CONFIRMATION", in step S1902, the device management section 421 establishes connection to the device scheduler 103 corresponding to the printer port (at the bottom left of the printing management unit 410). At this time, the device management section 421 reports the set unique ID. After the connection is successful, in step S1903, the device management section 421 reports history acquisition to the device scheduler 103, and acquires a history stored in the device scheduler 103. In step S1903, when the monitoring of the printing device re-registered in the monitored device queue is started, the printing-management server computer 101 can acquire the result of printing based on a print job whose printing has not been completed at interruption of monitoring. A printing device process corresponding to the acquisition in step S1903 is described below with reference to FIG. 22.

In step S1904, the job status (such as the job status 705, completion result 708, and completion time 709 of the job information 700 shown in FIG. 7) is updated on the basis of the history acquired in step S1903.

In step S1905, on the basis of the updated job status, the device management section 421 determines whether or not all the print jobs registered in the print queue have been completed. If all the print jobs have been completed, in step S1906, the device management section 421 deletes information of the printing device from the connection order list 800. In step S1907, the device management section 421 reports cancellation of the event registered in the device scheduler 103. In step S1908, the device management section 421 reports disconnection to the device scheduler 103, and sets the status of connection to the printing device to "DISCONNECTION".

If all the print jobs registered in the print queue have been completed, in step S1909, the device management section 421 reports event registration to the device scheduler 103, and proceeds to point 17 shown in FIG. 17B and point 15-2 shown in FIG. 15A. After proceeding to the above points, at least the processes shown in FIGS. 15A and 15B, and 17A and 17B are executed in parallel.

FIG. 20 is a flowchart showing a process of the device management section 421 when the backup printing process is executed.

When the backup printing process is started, in step S2001, the device management section 421 temporarily stops all the print jobs registered in a print queue which corresponds to a printing device in which an error occurs. In step S2002, the device management section 421 acquires backup printer information set in the printer port information. In step S2003, the device management section 421 registers, in the backup printer, all print jobs registered in the print queue. In step S2004, the device management section 421 cancels all the print jobs registered in a print queue of the backup printer, and sets the status of each cancelled print job to completion. In step S2005, the device management section 421 inserts the backup printing device at the top of "AWAITING CONNECTION" or "AWAITING CONFIRMATION" printing devices in the connection order list 800. Finally, in step S2006, the device management section 421 executes the printer switching process to realize the backup printing process.

Process of Device Scheduler 103

Figure 21:
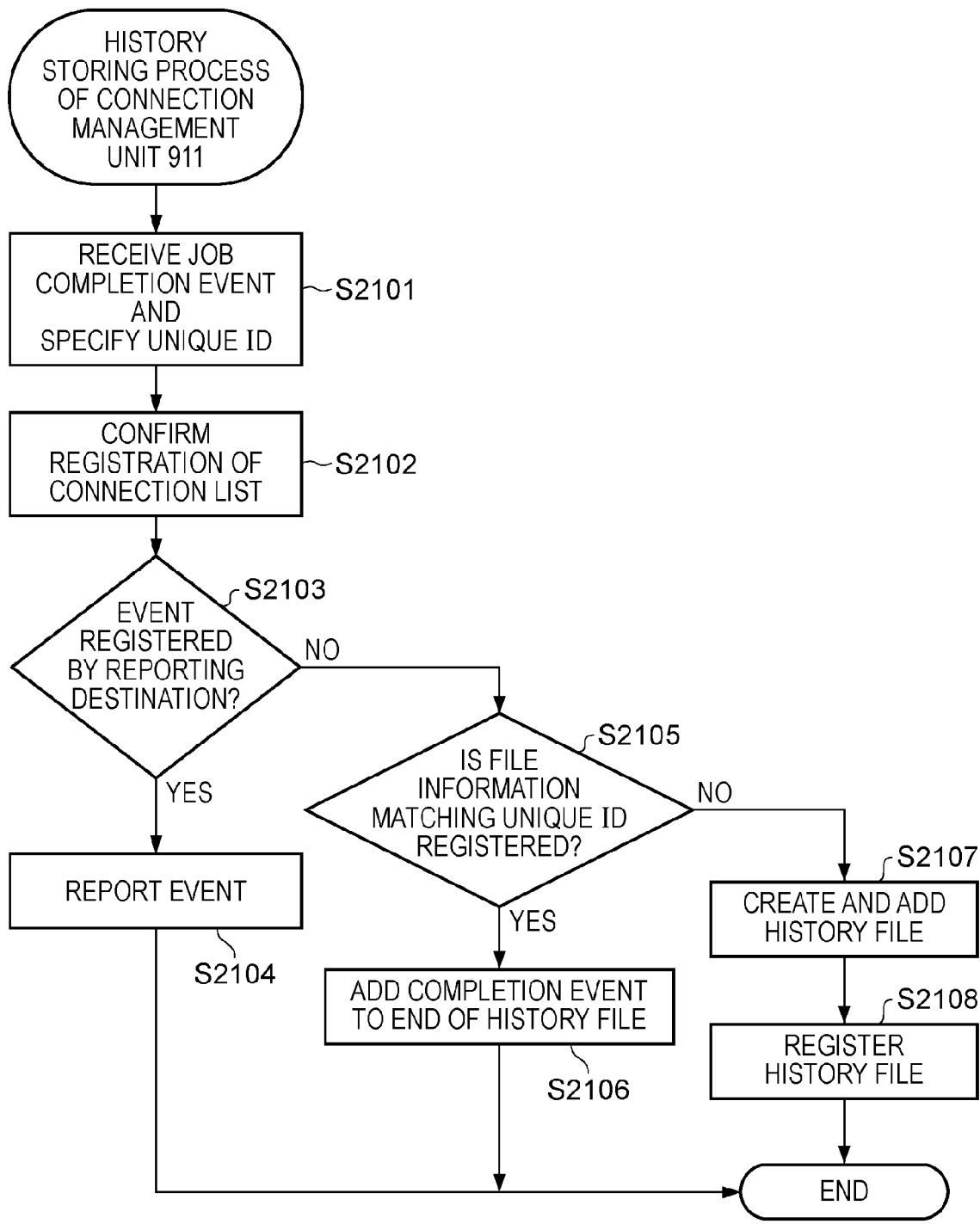
FIG. 21 is a flowchart showing an example of a history storing process of the device scheduler shown in FIG. 4.

FIG. 21 is a flowchart showing a process performed when a history storing process occurs in the device scheduler 103.

In step S2101, the device scheduler 103 receives a job completion event from the device controller 901, and the device scheduler 103 specifies a corresponding unique ID. In step S2102, the device scheduler 103 confirms registration in the connection list 1000 (FIG. 10) by using the specified unique ID as a key.

In step S2103, the device scheduler 103 determines whether or not a job input device, that is, a report destination to which a job completion event is reported, has registered an event. More specifically, by comparing a unique ID corresponding to a completion event and a unique ID included in the connection list 1000, it is determined whether or not both match each other.

If it is determined that the event has been registered, in step S2104, the reported completion even is reported from one or more connected computers to a computer corresponding to the unique ID. The process in FIG. 21 finishes.

If the report destination has not registered the event, or is not connected, in step S2105, the device scheduler 103 determines whether or not history file information corresponding to the unique ID corresponding to the completion event specified in step S2101 is registered in the history management file 1200.

If the history file information is registered, in step S2106, the completion event is added at the end of the history file that is associated with (based on the history file name 1214) the history file information. The added completion event is a history that the print job has finished.

If the history file information is not registered, in step S2107, a new history file is created before the completion event is added. Finally, in step S2108, the new history file is registered in the history management file 1200 before the process in FIG. 21 finishes.

Figure 22:
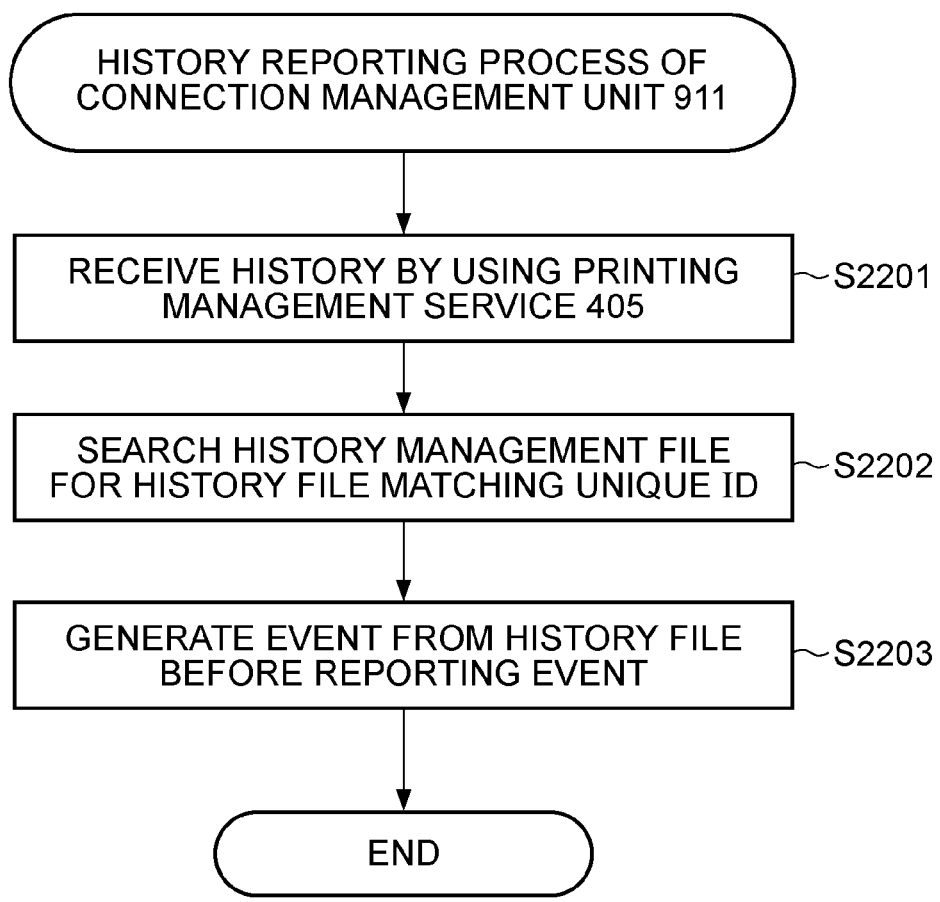
FIG. 22 is a flowchart showing an example of the history storing process of the device scheduler shown in FIG. 4.

FIG. 22 is a flowchart showing a process of the device scheduler 103 when it requests the history acquisition request from the printing management service 405.

In step S2001, the device scheduler 103, that is, the connection management unit 911, receives the history acquisition request from the printing management service. The history acquisition request corresponds to step S1903 in FIG. 19. The received history acquisition request includes a unique ID. Accordingly, by referring to the schedule list 1100 in FIG. 11, in step S2202, the connection management unit 911 searches the history management file 1200 for a history file matching the unique ID. In step S2203, the connection management unit 911 uses the obtained history file to generate a job completion event, and reports the job completion event to the printing management service. This history file includes at least a result (printing completion or printing incompletion) of printing based on a print job whose printing has not been completed at interrupt of monitoring.

As described above, by executing the above-described processes, the load on the printing-management server computer 101 can considerably be reduced. A single server computer is used to enable monitoring of a large number of printing devices, input of a large number of print jobs, and tracking to completion. This results in realizing a large reduction in the cost required for the printing-management server computer 101.

By way of example, in order to obtain advantages similar to those in the above-described embodiments, when print jobs that are input to printing devices remote locations are simultaneously managed, it is possible that, with print servers provided at the locations, an integrated server for managing the print servers in an integrated manner be provided. This configuration can reduce the load on the integrated server. However, installation and management of each print server at each location is expensive, and, in addition, when a problem occurs in the print server, it is difficult for the integrated server to detect and manage the problem. In addition, additional processing, such as collecting job information generated by the print servers at a plurality of locations, is required. When a device change occurs, a complicated operation of maintaining consistency in information between each print server and the integrated server is also required. According to the above embodiment, for example, even if, as described above, print jobs that are input to printing devices at remote locations are simultaneously managed, the cost required for a print server for monitoring statuses of the print jobs can be reduced.

Other Embodiments

Although the above embodiment has been described in detail, the present invention may be applied to a system including a plurality of devices, or may be applied to an apparatus formed by a single device. For example, the present invention may be applied to printers, facsimile machines, personal computers, computers including servers and clients, etc.

An embodiment of the present invention is achieved such that software programs for realizing the functions of the above-described embodiment are supplied to a system or apparatus directly or from a remote place, a computer included in the system or apparatus loads and executes the supplied program code.

Therefore, in order for the computer to realize the functions and processes of the present invention, program code that is installed into the computer also realizes the present invention. In other words, a computer program for realizing the functions and processes, itself, is included in the present invention.

In this case, the program may have any form if it has a program function. The forms include object code, a program to be executed by an interpreter, and script data that is supplied to an operating system.

Recording media for supplying the program include, for example, a flexible disk, a hard disk, an optical disc, a magneto-optical disc, a CD-ROM (compact-disc read-only memory), a CD-R (compact disc recordable), and a CD-RW (compact disc rewritable). The recording media also include a magnetic tape, a nonvolatile memory card, a ROM, DVDs (digital versatile discs) (DVD-ROM, DVD-R).

The program may be downloaded from a site on the Internet by using a browser of a client computer. In other words, the computer program, itself, of the present invention, or a compressed file having an automatic installation function may be downloaded from the site to a recording medium such as a hard disk. In addition, by dividing the program code of the program of the present invention into a plurality of files, and downloading the files from different sites, the present invention can be realized. That is, a World Wide Web server that allows a plurality of users to download program files for realizing the functions and processes of the present invention may be included in the present invention.

Furthermore, the program of the present invention may be distributed to users in a form stored in a storage medium such as a CD-ROM. In this case, only a user who satisfies predetermined conditions may download key information for decryption from a site via the Internet. The user may decrypt an encrypted program and may execute the decrypted program. The obtained program may be installed into a computer.

Moreover, the functions of the above-described embodiment may be realized in such a manner that the computer executes a read program. On the basis of the program, an OS or the like running on the computer may perform all or part of actual processing. Definitely, also in this case, the functions of the above-described embodiment can be realized.

Additionally, the program read from a recording medium may be written in a function expansion board added to the computer and in a memory provided in a function expansion unit connected to the computer. On the basis of instructions of the program, a central processing unit or the like provided on the function expansion board or unit may perform all or part of actual processing. In this manner, the functions of the above-described embodiment may be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-148242 filed May 29, 2006, which is hereby incorporated by reference herein in its entirety.

What is claimed is:

1. An information processing apparatus capable of communicating with a plurality of printing devices, the information processing apparatus comprising:

a registration unit configured to register, in a monitored device queue, among the plurality of printing devices, printing devices to which print jobs are to be output;

a monitoring unit configured to monitor the printing devices in accordance with an order of registering the printing devices in the monitored device queue by establishing a communication session with the printing devices in a case that a number of connected printing devices to be monitored does not reach a maximum number of connected printing devices;

a determination unit configured to perform a determination of whether or not predetermined conditions which relate to a number of print jobs consecutively transferred to the printing devices or time to consecutively monitor the printing device are satisfied;

a monitoring interruption unit configured to interrupt monitoring of one printing device among the monitored printing devices on the basis of the determination by the determination unit by breaking the communication session with the one printing device, even if print job by the one printing device is not completed, wherein the registration unit re-registers, the printing device whose monitoring is interrupted, in the monitored device queue so as to re-establish a communication session, in a case that there is an uncompleted print job among print jobs registered in the printing device whose monitoring is interrupted while the registration unit does not register, in the monitored device queue, the printing device whose monitoring is interrupted in a case that there is not an uncompleted print job among print jobs registered in the printing device whose monitoring is interrupted; and an acquisition unit configured to start storing a print result of a print job from when the printing device is excluded from a printing device to be monitored by the information processing apparatus, and acquire the print result of the print job stored in a period until the printing device whose monitoring is interrupted is registered in a monitored device queue again as a printing device to be monitored at a timing when the printing device whose monitoring is interrupted is registered in the monitored device queue again as the printing device to be monitored.

2. The information processing apparatus according to claim 1, wherein, after the monitoring interruption unit interrupts the monitoring, the monitoring unit monitors the printing devices on the basis of a registration status of the printing devices registered in the monitored device queue by the registration unit.

3. The information processing apparatus according to claim 1, wherein the predetermined conditions include the number of print jobs consecutively transferred to the printing devices, and a continuous monitoring time for continuously performing the monitoring.

4. The information processing apparatus according to claim 3, further comprising a first setting unit configured to set, as one of the predetermined conditions, the number of print jobs capable of being consecutively transferred during the monitoring.

5. The information processing apparatus according to claim 3, further comprising a second setting unit configured to set, as one of the predetermined conditions, a time in which continuous monitoring can be performed during the monitoring.

6. The information processing apparatus according to claim 5, further comprising an initialization unit configured to return the continuous monitoring time to an initial value when a change in print job status is reported from one of the monitored printing devices to the information processing apparatus until the time set by the second setting unit has elapsed.

7. A printing device monitoring method for an information processing apparatus capable of communicating with a plurality of printing devices, the printing device monitoring method comprising the steps of:
sequentially registering, in a monitored device queue, among the plurality of printing devices, printing devices to which print jobs are to be output;
monitoring the printing devices in accordance with an order of registering the printing devices in the monitored device queue by establishing a communication session with the printing devices in a case that a number of connected printing devices to be monitored does not reach a maximum number of connected printing devices;
performing a determination of whether or not predetermined conditions which related to a number of print jobs consecutively transferred to the printing devices or time to consecutively monitor the printing devices are satisfied;
interrupting monitoring of one printing device among the monitored printing devices on the basis of the determination by breaking the communication session with the one printing device, even if print job by the one printing device is not completed;
re-registering, the printing device whose monitoring is interrupted, in the monitored device queue so as to re-establish a communication session, in a case that there is an uncompleted print job among print jobs registered in the printing device whose monitoring is interrupted while not registering, in the monitored device queue, the printing device whose monitoring is interrupted in a case that there is not an uncompleted print job among print jobs registered in the printing device whose monitoring is interrupted;
storing a print result of a print job from when the printing device is excluded from a printing device to be monitored by the information processing apparatus, and acquiring the print result of the print job stored in a period until the printing device whose monitoring is interrupted is registered in the monitored device queue again as a printing device to be monitored at a timing when the printing device whose monitoring is interrupted is registered in the monitored device queue again as the printing device to be monitored.

8. The printing device monitoring method according to claim 7, wherein, in the monitoring step, after the monitoring is interrupted, the printing devices are monitored on the basis of a registration status obtained after re-registering the printing device whose monitoring is interrupted.

9. The printing device monitoring method according to claim 7, wherein the predetermined conditions include the number of print jobs consecutively transferred to the printing devices, and a continuous monitoring time for continuously performing the monitoring.

10. The printing device monitoring method according to claim 9, further comprising a step of setting, as one of the predetermined conditions, the number of print jobs capable of being consecutively transferred during the monitoring.

11. The printing device monitoring method according to claim 9, further comprising a step of setting, as one of the predetermined conditions, a time in which continuous monitoring can be performed during the monitoring.

12. The printing device monitoring method according to claim 11, further comprising a step of returning the continuous monitoring time to an initial value when a change in print job status is reported from one of the monitored printing devices to the information processing apparatus until the time set in the re-registering step has elapsed.

13. A non-transitory computer-readable storage medium storing a printing device monitoring program to be executed by an information processing apparatus capable of communicating with a plurality of printing devices, the printing device monitoring program comprising the steps of:
sequentially registering, in a monitored device queue, among the plurality of printing devices, printing devices to which print jobs are to be output;
monitoring the printing devices in accordance with an order of registering the printing devices in the monitored device queue by establishing a communication session with the printing devices in a case that a number of connected printing devices to be monitored does not reach a maximum number of connected printing devices;
performing a determination of whether or not predetermined conditions which relate to a number of print jobs consecutively transferred to the printing devices or time to consecutively monitor the printing devices are satisfied;
interrupting monitoring of one printing device among the monitored printing devices on the basis of the determination by breaking the communication session with the one printing device, even if print job by the one printing device is not completed;
re-registering, the printing device whose monitoring is interrupted, in the monitored device queue so as to re-establish a communication session, in a case that there is an uncompleted print job among print jobs registered in the printing device whose monitoring is interrupted while not registering, in the monitored device queue, the printing device whose monitoring is interrupted in a case that there is not an uncompleted print job among print jobs registered in the printing device whose monitoring is interrupted; and storing a print result of a print job from when the printing device is excluded from a printing device to be monitored by the information processing apparatus, and acquiring the print result of the print job stored in a period until the printing device whose monitoring is interrupted is registered in the monitored device queue again as a printing device to be monitored at a timing when the printing device whose monitoring is interrupted is registered in the monitored device queue again as the printing device to be monitored.

* * * * *